(12) United States Patent
Kuwabara

(10) Patent No.: US 7,258,486 B2
(45) Date of Patent: Aug. 21, 2007

(54) LINEAR MOTION GUIDE UNIT

(75) Inventor: Hideki Kuwabara, Mino (JP)

(73) Assignee: Nippon Thompson Co. Ltd., Tokyo (JP)

( * ) Notice: Subject to any disclaimer, the term of this patent is extended or adjusted under 35 U.S.C. 154(b) by 150 days.

(21) Appl. No.: 11/135,512

(22) Filed: May 24, 2005

(65) Prior Publication Data

US 2005/0265638 A1  Dec. 1, 2005

(30) Foreign Application Priority Data

May 28, 2004 (JP) ............................ 2004-158813
Jun. 23, 2004 (JP) ............................ 2004-184449

(51) Int. Cl.
*F16C 29/06* (2006.01)

(52) U.S. Cl. ................................................ 384/45

(58) Field of Classification Search ............... 384/45, 384/44, 43; 464/168
See application file for complete search history.

(56) References Cited

U.S. PATENT DOCUMENTS 6,200,031 B1   3/2001   Faulhaber et al.
6,685,355 B2   2/2004   Kuwahara
2002/0102035 A1  8/2002  Kuwahara

FOREIGN PATENT DOCUMENTS

| JP | 6147222 | 5/1994 |
| JP | 2936166 | 10/1997 |
| JP | 2001-12465 | 7/2002 |
| JP | 2002227840 | 8/2002 |

*Primary Examiner*—Lenard A. Footland
(74) *Attorney, Agent, or Firm*—Browdy and Neimark, PLLC

(57) ABSTRACT

A linear motion guide unit is disclosed, in which a slider fitting over a guide rail for movement is comprised of three components save rolling elements. The three components are joined together in the slider with using no fastener such as threaded fasteners, but just with fit-engagement that makes it possible to shrink the slider down in size. The three components are made up of a carriage made therein with raceway grooves and return passages, an upper component applied to the carriage to fit into recesses on the top surface of the carriage, and a lower component applied to the carriage to fit into recesses on the bottom surface of the carriage. The upper and lower components are joined together with the help of fit-engagement of hooks and hook holes, with holding firmly the carriage between them.

16 Claims, 20 Drawing Sheets

LINEAR MOTION GUIDE UNIT

FIELD OF THE INVENTION

The present invention relates to miniaturization of a linear motion guide unit comprised of a guide rail made with guide grooves, and a slider allowed to travel on the guide rail by virtue of more than one rolling element.

BACKGROUND OF THE INVENTION

Most linear motion guide units used extensively in diverse fields of machinery such as semiconductor manufacturing equipments, various assembly machines, inspection instruments, medical gadgets, measurement instruments, and so on are needed in years to shrink them down as minuscule or tiny as permitted in construction, even with making sure of highly precise and smooth movement between components allowed to slide relatively to one another. Latest advanced linear motion guide units have been in pursuit of maintenance-free and especially miniaturization in construction, besides improvements in operational performance including high precision, fast travel, and so on. To meet with the micromechanical requirements as stated earlier, a variety of components and parts to build the linear motion guide unit is getting smaller in construction and less in their number to reduce the assembling steps as well as make any difference in dimension between mating parts less, which might occur in assembling steps, thereby making components or parts as integral as possible. Moreover, it has been needed to relieve the carriage of the slider from many chores including tiny hole-making operation, tiny tapping operation, tiny screw-driving operation, and so on. In summary, the linear motion guide units are now one of the elementary machines practically indispensable to every machine and correspondingly they are used in a wide range of sizes and versions. Nevertheless, modern advanced micromachines needs to further shrink the linear motion guide unit down in size, even with making certain of nimble sliding operation of the slider over the guide rail.

One version of the prior linear motion guide units is disclosed in the commonly assigned Japanese Patent Laid-Open No. 2001-12465, in which a guide rail is composed of a pair of lengthwise sides and a lengthwise bottom joining the sides together with one another along their lengthwise lower edges. With the prior linear motion guide unit recited just above, a slider is comprised of a carriage mostly accommodated in a lengthwise recess defined between widthwise opposing sides of the guide rail, end caps arranged on forward and aft ends of the carriage, one to each end, and end seals attached on the end caps, one to each cap, to seal clearances between the guide rail and the end caps. The end caps and end seals are tightened together to the carriage by means of machine screws, which are screwed into matching threaded holes made in the carriage.

With the prior linear motion guide unit constructed as stated earlier, the carriage is necessarily made therein with threaded holes that are used to fasten both the end caps having turnaround passages therein and the end seals on the forward and aft ends of the carriage. Thus, the prior linear motion guide unit recited earlier is remarkably complicated in construction and further has to go through some troublesome processes of tapping into the carriage in advance to hardening of the carriage, and precise fitting, combining and mating the associated parts or components together with one another to assemble the carriage with the end caps and end seals into a unitary slider. Tapping into the carriage is especially unfit for the tiny carriage, which would experience working, assembling, and so on to finish micromechanical linear motion guide units.

Another commonly assigned Japanese Patent Laid-Open No. 2002-227840 discloses a linear motion guide unit suited to be miniaturization, in which component parts to be combined with a carriage are reduced in number while the parts are assembled together in a snap-fit manner. The slider is comprised of a carriage made up of a major upper portion and side portions depending downwards from widthwise opposing edges of the major upper portion, and a composite member including end caps facing forward and aft ends of the carriage and a covering frame integral with the end caps. The composite member is composed of a first member and a second member adapted to fit over the first member from the outside. With the linear motion guide unit constructed as stated earlier, the composite member is brought into engagement with the carriage after first engaging parts or recesses in the forward and aft ends of the carriage have fit over or conform to their mating second engaging parts or projections in the first member of the composite member.

With the linear motion guide unit recited just above, formation of the first engaging parts or recesses in the carriage is needed to fit the composite member over the carriage. Thus, the carriage has to experience working operation to make the first engaging parts prior to hardening process of the carriage to make raceway grooves on steel material. This means that the prior linear motion guide unit recited is also complicated in construction and further unfit for working, assembling operation, and so on to finish micromechanical linear motion guide units.

Another version of the prior linear motion guide units is disclosed, for example in Japanese Patent Laid-Open No. H06-147222, in which a slider striding over a linear guide tack for movement is made up of first to third components. With the linear motion guide unit recited now, the first component includes forward and aft end caps and lengthwise intermediate members joined integrally with the end caps to provide sidewise outside lower portions to define return passages. The second components has a major portion made of metallic material having a lengthwise dimension corresponding to a load-carrying raceway and a return passage of a recirculating circuit where more than one rolling element is allowed to roll through there. The second component further has widthwise opposing ridges raised integrally downwards below the major portion over the lengthwise dimension equal with the overall length of the major portion to provide sidewise inside lower portions to define return passages. The third component is made of forward and aft blocks that are used to fit into forward and aft clearances left between the end caps of the first component and their associated lengthwise end surfaces of the second component, one to each clearance.

With the linear motion guide unit constructed as stated just earlier, tapping operation on the forward and aft ends of the major portion in the second component is needed to join the second component together with both the first and third components with using screws. Thus, the prior linear motion guide unit stated just above, as with other versions recited earlier, is also complicated in construction and further unfit for working, assembling, and so on to finish micromechanical linear motion guide units.

A further another version of the prior linear motion guide arrangement is disclosed in, for example Japanese patent No. 2936166, in which a guide rail having an axis is combined with a guide carriage movable on the guide rail in the direction of the axis, which runs on the guide rail with intermediacy of an endless rolling-element circuit. With the linear motion guide arrangement recited above, the guide carriage includes a guide carriage housing to form a positioning well into which a carriage member fits together with reversing bodies.

The linear motion guide arrangement constructed as stated earlier is needed to make the positioning well, and therefore is complicated in construction and further unfit for working, assembling, and so on to finish micromechanical linear motion guide units.

SUMMARY OF THE INVENTION

The present invention, therefore, has as its primary object to overcome the shortcomings as stated earlier and in particular to provide a linear motion guide unit made much minuscule in size as well as simple in construction to meet with industrial requirement of miniaturization, even with high in desired stiffness and operating performances including smooth movement, high-precision position control, and high-speed response, compared with the linear motion guide unit constructed as disclosed in the commonly assigned Japanese Patent Laid-Open No. 2001-12465 recited earlier. More particularly, the present invention provides a linear motion guide unit in which a slider movable on a guide rail is constituted with three components of a carriage, and first and second members replacing conventional end caps to reduce the component or parts in number, and the first and second members fit over the carriage in a way they hold securely the carriage between them with using no fastening element such as screws and the like, but only conjoining means including fit-engagement, fusion welding, adhesion, and so on of the first and second members with one another.

The present invention is concerned with a linear motion guide unit; comprising a guide rail having a pair of first raceway grooves extending in lengthwise direction of the guide rail, a slider conforming to the guide rail for movement relatively to the guide rail and also having second raceway grooves in opposition to the first raceway grooves, and more than one rolling element allowed to roll through load races defined between the first and second raceway grooves, the slider being made therein with forward and aft turnaround passages and return passages, the forward and aft turnaround passages being each communicated at one end thereof with the associated load race and at the other end thereof with the associated return passage to make a recirculating circuit allowing the rolling elements to circulate through there;

wherein the slider includes a carriage made therein with the second raceway grooves and first return grooves for the return passages, a first member extended across lengthwise opposite ends of the carriage and provided at lengthwise opposite ends thereof with forward and aft turnaround surfaces to form the forward and aft turnaround passages communicated with lengthwise opposite ends of the associated second raceway groove, and a second member having thereon forward and aft turnaround grooves to form the forward and aft turnaround passages in conjunction with the forward and aft turnaround surfaces and second return grooves to form the return passages in conjunction with the first return grooves; and wherein the first member is applied to any one surface of the carriage while the second member is applied to any other surface of the carriage to put firmly the carriage between the first and second members, and just the first and second members are joined to one another with engaging means.

In one aspect of the present invention, there is disclosed a linear motion guide unit in which the engaging means is any one selected from fit-engagement made between parts complementary to one another formed on the first and second members, fusion welding applied at least in part to a closely mated area made between the first and second members, adhesive bonding, and mechanical fastening including screws and staples. In another aspect of the present invention, a linear motion guide unit is disclosed in which the fit-engagement is performed between a hole made in any one of the first and second members and a projection raised above the other member to fit into the hole. In a further another aspect of the present invention, a linear motion guide unit is disclosed in which the projection is made to have a contour in cross section, where a circle in cross section is partially cut away on diametrically opposite secant lines to have diametrically opposite flat surfaces.

In another aspect of the present invention, there is disclosed a linear motion guide unit in which the first return grooves cut in the carriage are made on inward surfaces of fore-and-aft wings of the carriage, which are spaced away from one another widthwise of the carriage.

In another aspect of the present invention, there is disclosed a linear motion guide unit in which a guide rail is made up of a pair of lengthwise sides spaced widthwise away from each other and a bottom joined lengthwise thereof together with the sides to form a lengthwise trough of U-shape in transverse section; and wherein the first raceway grooves are cut into inward surfaces of the sides.

In another aspect of the present invention, there is disclosed a linear motion guide unit in which the carriage is made on the one surface thereof with first recesses that extend fore and aft along widthwise spaced edges of the carriage and on the other surface thereof with a second recess that extends fore and aft between the widthwise spaced wings of the carriage; wherein the first member fits at first lengthwise conjunctive portions thereof into the first recesses while the second member fits at a second lengthwise conjunctive portion thereof into the second recess; and wherein the first return grooves are cut deep into the second recess while the second raceway grooves are cut into outward sides of the carriage.

In another aspect of the present invention, there is disclosed a linear motion guide unit in which the first member includes first forward and aft end plates conforming in location to the lengthwise opposite ends of the carriage, the first forward and aft end plates having thereon the turnaround surfaces to form the turnaround passages, the first forward and aft end plates being made integral with the first lengthwise conjunctive portions that extend between the first forward and aft end plates to fit into the first recesses on the carriage, and the first forward and aft end plates being further made on their outward end surfaces thereof with any one of the projection and hole complementary to one another to join the first member to the second member.

In another aspect of the present invention, there is disclosed a linear motion guide unit in which the second member includes second forward and aft end plates and a major portion that is made integral with the second forward and aft end plates to extend between them, the second forward and aft end plates conforming in location to outward end surfaces of the first forward and aft end plates and having any one of the projection and hole in opposition to the complementary part on the first member to join together the first and second member, and wherein the major portion includes forward and aft turnaround areas merging with their associated second forward and aft end plates, and the second lengthwise conjunctive portion that extends between the forward and aft turnaround areas to fit into the second recess on the carriage, the forward and aft turnaround areas conforming in location to the lengthwise opposite ends of the carriage and having the turnaround grooves communicating with their associated load races, and the second lengthwise conjunctive portion being made therein with the second return grooves.

In a further another aspect of the present invention, there is disclosed a linear motion guide unit, in which the guide rail has the first raceway grooves that extend lengthwise on widthwise opposite sides of the guide rail, and in which the first member is applied to any one surface of the carriage while the second member is applied to any other surface of the carriage to put firmly the carriage between the first and second members, and the first and second members are joined to one another with mutual fit-engagement.

In another aspect of the present invention, a linear motion guide unit is disclosed in which the first return grooves on the carriage are made on widthwise opposite sides of the carriage. In a further another aspect of the present invention there is disclosed a linear motion guide unit in which the guide rail is made in a form of rectangle in transverse section, which is made in the lengthwise sides thereof with threaded holes that are disposed lengthwise at selected intervals and used to fasten any other part to the guide rail.

In another aspect of the present invention, there is disclosed a linear motion guide unit in which the carriage is made concaved fore and aft to fit over the guide rail; wherein the carriage is further made on the one surface thereof with first recesses that extend fore and aft along widthwise spaced edges of the carriage to fit first lengthwise conjunctive portions of the first member into the first recesses, and on the other surface thereof with second recesses that extend fore and aft along widthwise spaced edges of the carriage to fit second lengthwise conjunctive portions of the second member into the second recesses; and further in which the return grooves are cut deep into the second recesses while the second raceway grooves are made in inward surfaces surrounding the fore-and-aft concave made in the carriage.

In another aspect of the present invention, there is disclosed a linear motion guide unit in which the first member includes first forward and aft end plates conforming in location to lengthwise opposite ends of the carriage, the first forward and aft end plates having thereon the turnaround surfaces to form the turnaround passages, the first forward and aft end plates being made integral with the first lengthwise conjunctive portions that extend between the first forward and aft end plates to fit into the first recesses on the carriage, the first forward and aft end plates in combination with the first lengthwise conjunctive portions defining a first window where the one surface of the carriage is allowed to fit into there, and the first forward and aft end plates being further made on their outward end surfaces thereof with any one of the projection and hole complementary to one another to join the first member to the second member.

In another aspect of the present invention, there is disclosed a linear motion guide unit in which the second member includes second forward and aft end plates and second lengthwise conjunctive portions made integral with the second forward and aft end plates and extended between the first forward and aft end plates to fit into the second recesses on the carriage, the second forward and aft end plates conforming in location to outward end surfaces of the first forward and aft end plates and having any one of the projection and hole in opposition to the complementary part on the first member to join together the first and second member, and the second lengthwise conjunctive portions including forward and aft turnaround areas and lengthwise intermediate portions extending fore and aft between the forward and aft turnaround areas, the forward and aft turnaround areas conforming in location to the lengthwise opposite ends of the carriage and having the turnaround grooves communicating with their associated load races, and the lengthwise intermediate portions being made therein with the second return grooves, and further in which the forward and aft turnaround areas in combination with the lengthwise intermediate portions defines a second window where the other surface of the carriage is allowed to fit into there, In a further another aspect of the present invention, there is disclosed a linear motion guide unit in which the carriage is provided on widthwise opposite sides thereof with flanges, which are made by forming the first fore-and-aft recesses and the second fore-and-aft recesses, and wherein the first member and the second member are applied to the carriage to put the flanges between the first lengthwise conjunctive portions of the first member and the second lengthwise conjunctive portions of the second member in a way the first and second conjunctive portions are not prominent sidewise over the flanges, but flush with the flanges to make sure of mechanical stiffness of the slider in widthwise direction.

With the linear motion guide unit constructed as stated earlier, the slider can be constituted with a remarkably reduced number of parts required, or three components of a carriage, upper component and lower component save for rolling elements. The upper and lower components, after applied to the carriage to put the carriage between them, are joined with the carriage altogether in a single assembling operation with the help of just fit-engagement between the upper and lower components. Thus, the slider itself may be made ultimately simple in construction as well as finished with high accuracy, even with keeping mechanical stiffness necessary for the slider, because of relieved of a likelihood of cumulative error that would be otherwise caused by assembling procedures of some components and parts. Constructional features of the present invention help ensure accurate geometric relation among the three components, even with making it easier to shrink the slider down. Thus, the present invention provides a minuscule slider that is allowed to travel with high accuracy relatively to the guide rail to deal with high-speed smooth movement of any object such as workpiece, instrument, with high accuracy and reliability.

DETAILED DESCRIPTION OF THE PREFERRED EMBODIMENTS

Figure 1:
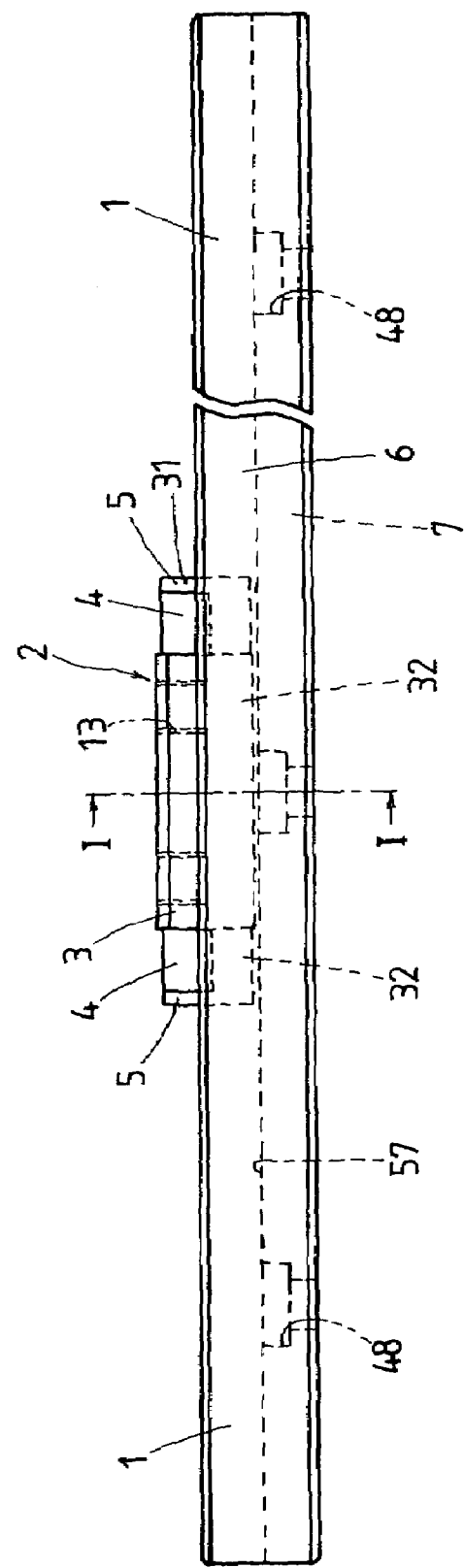
FIG. 1 is a front elevation, partly broken away, showing a preferred embodiment of a linear motion guide unit according to the present invention.
Figure 2:
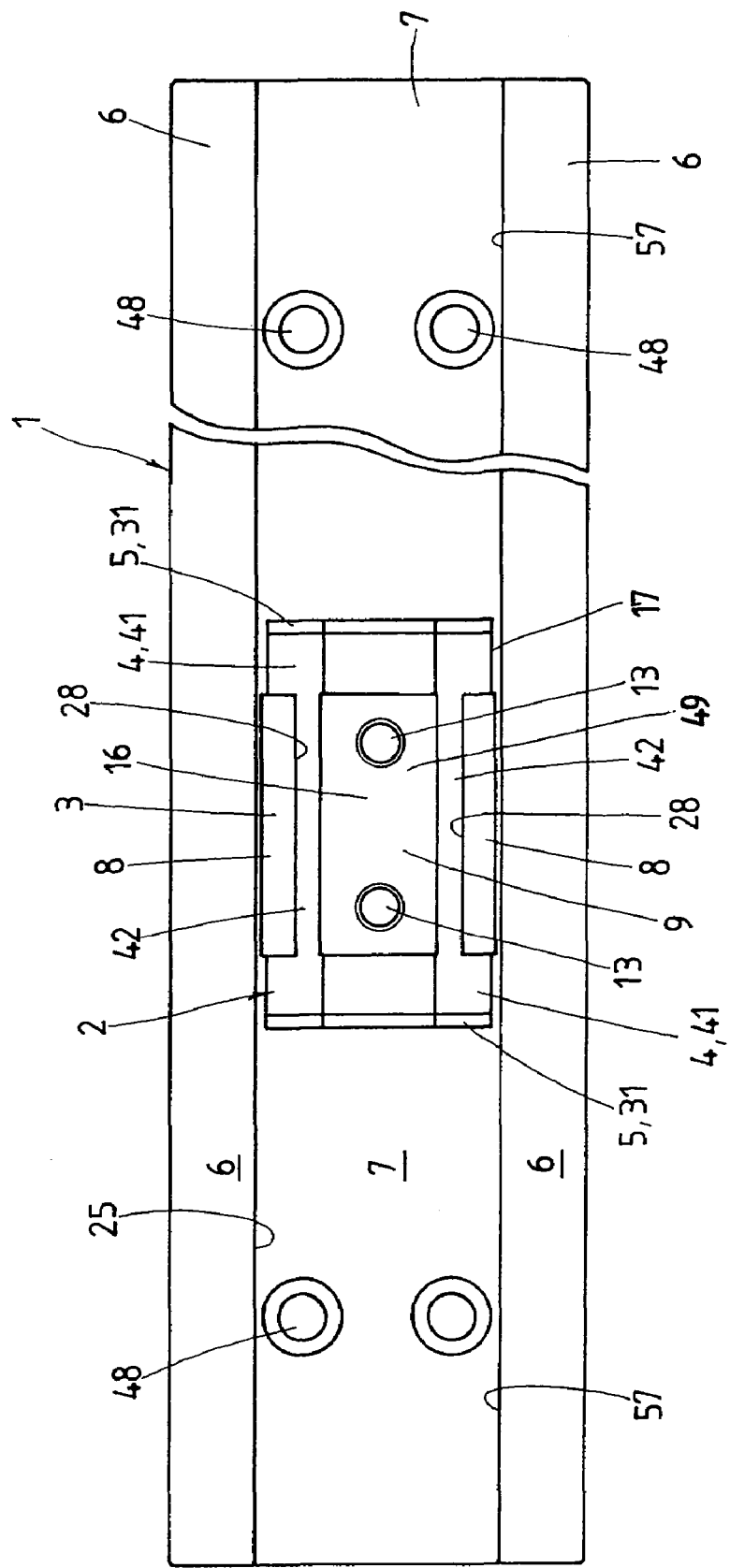
FIG. 2 is a plan view, partly broken away, of the linear motion guide unit of FIG. 1.
Figure 3:
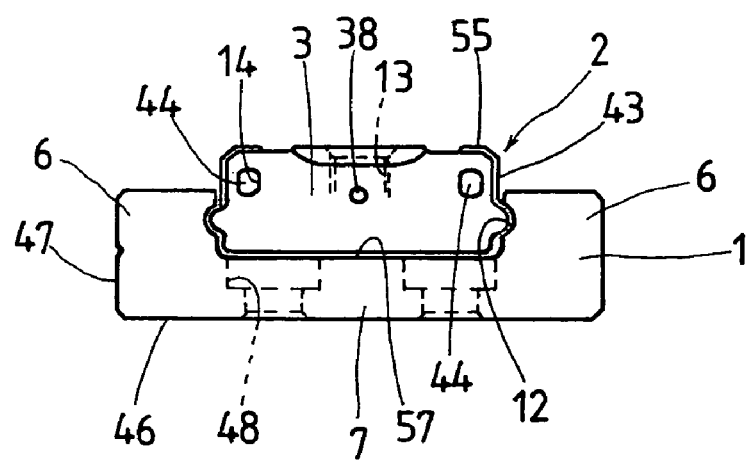
FIG. 3 is a view in side elevation of the linear motion guide unit of FIG. 1.

The present invention will be explained in detail by way of example with reference to the accompanying drawings. The linear motion guide unit according to the present invention is suited for use in relatively movable mechanics for machinery as diverse as semiconductor manufacturing machines, various assembly machines, precision machines, measuring instruments, medical instruments, micromachines, industrial robots, and so on, and more particular constructed as small as possible in size, even with keeping the desired operating performances including high stiffness, smooth movement, high-precision position control, and so on.

The present invention is motivated to further develop the technical conception disclosed in the commonly assigned Japanese Patent Laid-Open No. 2002-227840 to provide a linear motion guide unit made more simplified in construction as well as miniaturized in size, even with easier in production, high in stiffness of a slider, preferable in operating performances including smooth reciprocating movement of the slider relatively to the guide rail, simple and accurate position-control, and so forth. The linear motion guide unit of the present invention has the constructional feature in which a slider 2 is comprised of a carriage 3, a first member or an upper component 4, a second member or a lower component 5, and more than one rolling element 11, and further the carriage 3 is made thereon with no fastening means including threaded holes, mating holes, pins, and so on, which are very commonly in the existing slider to assemble the mating components together with one another, thereby helping shrink the guide unit down in size.

The first version of the linear motion guide unit according to the present invention is of the type in which a guide rail 1 is made up of a pair of lengthwise sides 6 and a bottom 7 joined lengthwise thereof together with the sides 6 to form a lengthwise trough of U-shape in transverse section while a slider 2 fits for reciprocating movement into a recess 57 defined between sides 6 in a way sinking mostly in the recess 57. This first version of the linear motion guide unit well serves for a diversity of applications including semiconductor manufacturing machines, various assembly machines, measuring instruments, medical instruments, micromachines, and so on, and more particular is expected to make certain of stiffness enough to ensure smooth reciprocating motion as well as accurate position-control of the slider, which is made very small in construction. Moreover, the slider 2, unlike the existing slider having a carriage 3 made with any threaded holes for fastening bolts, has no need to be made with fastening or engaging means including threaded holes, mating parts, and so on to fasten any other components to forward and aft ends 18 of the carriage 3.

The linear motion guide unit is mainly comprised of the guide rail 1 having lengthwise first raceway grooves 12 cut into inward surfaces 25 of the widthwise opposing sides 6, one to each inward surface, the slider 2 fit in the guide rail 1 for movement relatively to the guide rail 1, the slider 2 having the carriage made on sidewise opposing surfaces 17 thereof with fore-and aft second raceway grooves 26 in opposition to the first raceway grooves 12, and more than one rolling element 11 allowed to run through load races 15 defined between the first and second raceway grooves 12, 26. The slider 2 further includes therein forward and aft turnaround passages 35 and return passages 20. Each turnaround passage 35 is communicated at any one end thereof with the associated load race 15 while at another end thereof with the associated return passage 20, thereby to establish a closed circuit allowing more than one rolling element 11 to circulate through there.

Figure 4:
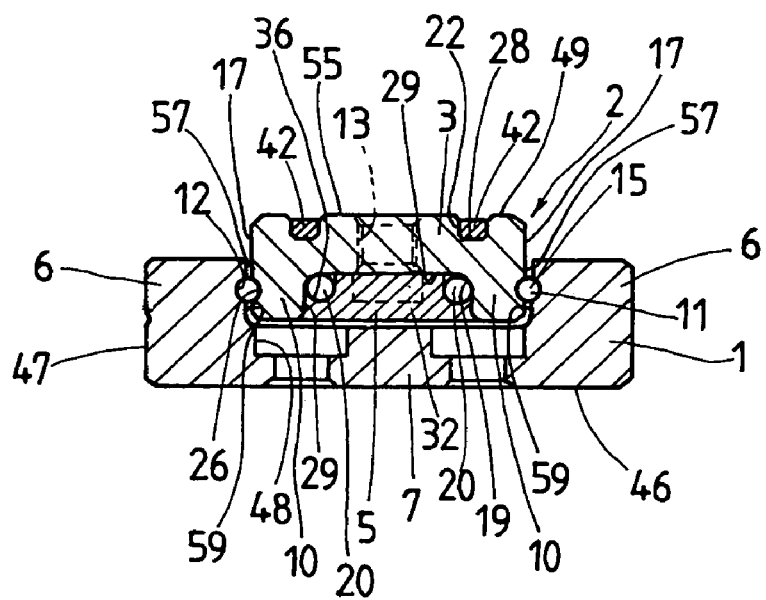
FIG. 4 is a view in transverse section of the linear motion guide unit of FIG. 1, the view being taken along the plane of the line I-I of the figure.
Figure 5:
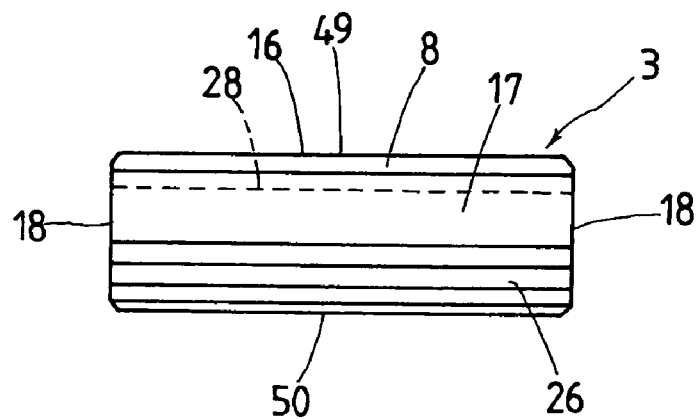
FIG. 5 is a view in front elevation of a carriage for the linear motion guide unit of FIG. 1.
Figure 6:
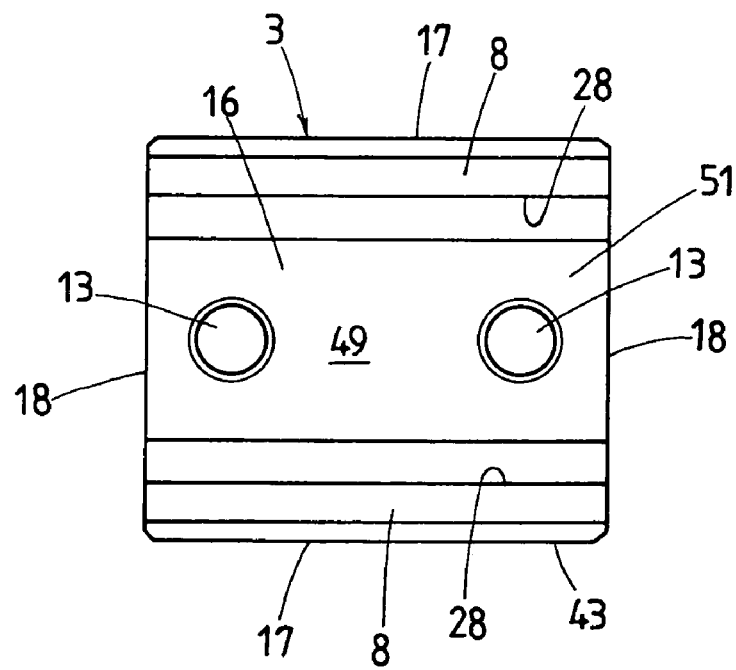
FIG. 6 is a plan view of the carriage of FIG. 5.
Figure 7:
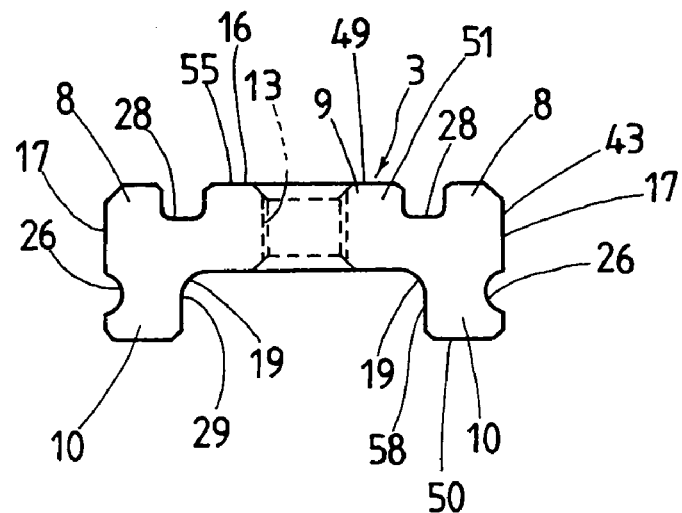
FIG. 7 is a view in side elevation of the carriage of FIG. 5.
Figure 8:
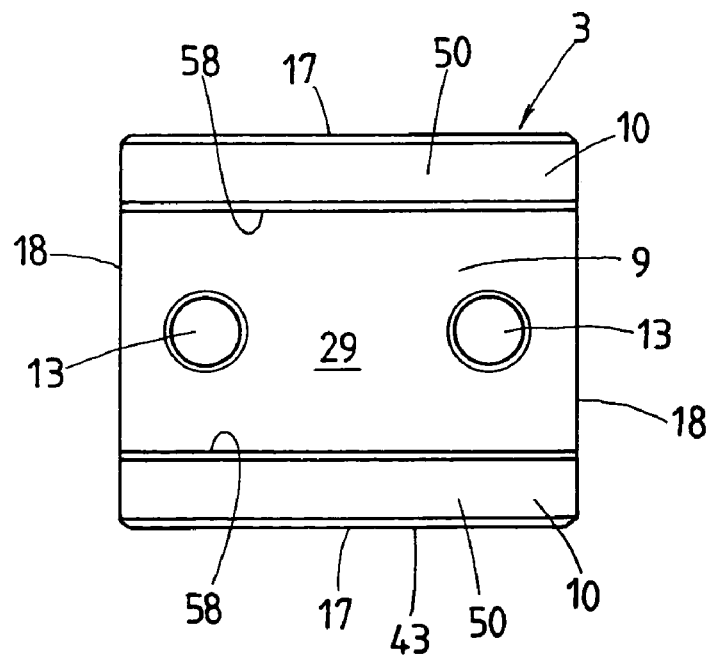
FIG. 8 is a bottom view of the carriage of FIG. 5.

The slider 2 is comprised of the carriage 3 provided therein with the second raceway grooves 26 and first return grooves 19 to form the return passages 20, a first member or upper component 4 extending along the carriage 3 to reach the lengthwise opposing ends 18 of the carriage 3 and having turnaround surfaces 23 at forward and aft ends thereof, where the turnaround passages 35 are made to come into connection with forward and aft ends of their associated second raceway grooves 26, and a second member or lower component 5 having turnaround grooves 34 to form the turnaround passages 35 in association with the turnaround surfaces 23 of the upper component 4, and second return grooves 36 to form the return passages 20 in combination with their associated first return grooves 19. Especially, the linear motion guide unit constructed as stated earlier has the constructional feature in which the carriage 3, as shown in FIG. 4, is held securely between the upper component 4 applied from above on a top surface or one surface 49 of the carriage 3 and the lower component 5 applied from bottom on a lower surface or another surface 50 of the carriage 3, whereby the carriage 3 is joined together with both the upper and lower components 4, 5, drawing upon only engaging means of the upper component 4 and the lower component 5. With this first version stated just earlier, the upper component 4 fits into a lengthwise recess 37 defined between second forward and aft end plates 31.

Figure 18:
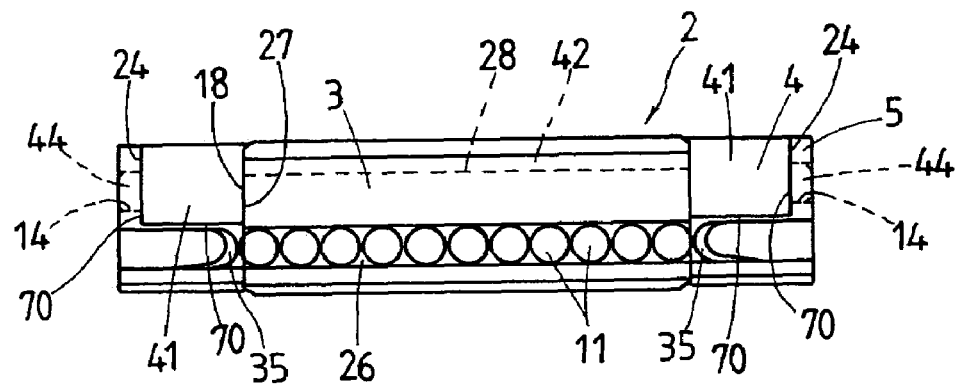
FIG. 18 is a view in front elevation of a finished slider for the linear motion guide unit of FIG. 1.
Figure 19:
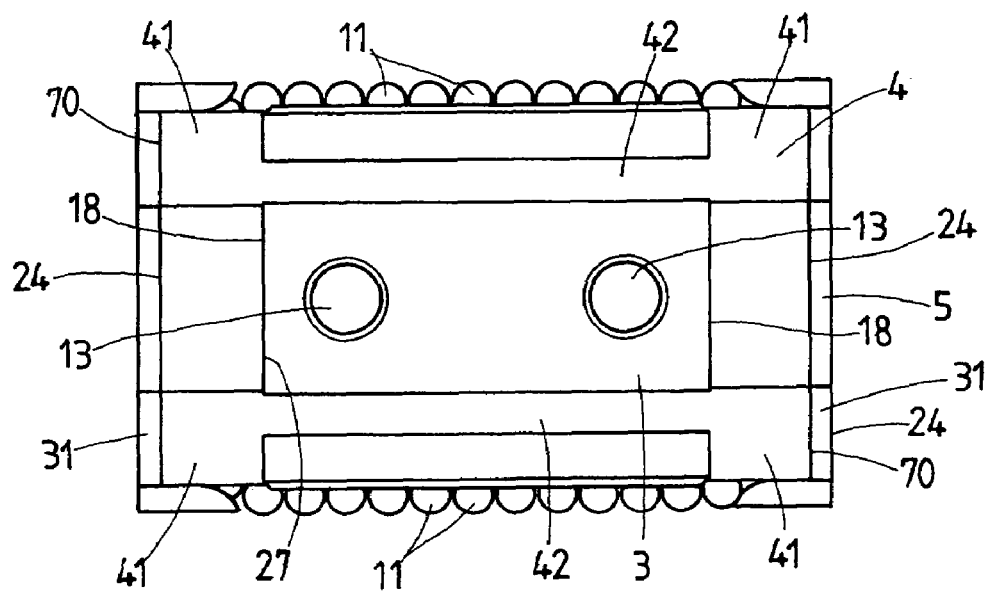
FIG. 19 is a plan view of the slider of FIG. 18.
Figure 20:
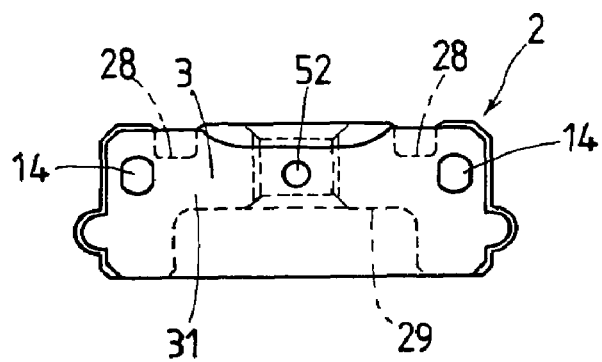
FIG. 20 is a view in side elevation of the slider of FIG. 18.

With the linear motion guide unit constructed as stated earlier, the engaging means recited above, as shown in FIGS. 18 to 20, is made of fastener construction where any one of mating parts on the upper and lower components 4, 5 fit into the other.

The fastener construction is made up of a projection or hook extending from any one of the upper and lower components 4, 5, and a hook hole made in the other. Upon assembly, the hook is allowed to fit into the associated hook hole to join firmly the upper and lower components 4, 5 together with one another. In the first version illustrated here, the upper component 4 is made with hooks 44 while the lower component 5 is made with hook holes 14. The hooks 44 are provided on outward surfaces 24 of the forward and aft first end plates 41 of the upper component 4. On each first end plate 41, two hooks 44 are raised above the outward surface 24 on either side of the first end plate 41, one to each side. In contrast, the hook holes 14 on the lower component 5 are made at locations matching with their associated hooks 44. Thus, it will be understood that the upper and lower components are allowed to join securely but detachably together with one another after the hooks 44 have fit into their associated hook holes 14.

In the first version illustrated, the engaging means is shown in the construction of fit-engagement of the hook 44 with the associated hook hole 14. There are considered some alternatives to the engaging means illustrated in the first version. As an alternative, any staples, although not shown, may be used to join the upper component 4 and lower component 5 together with one another. Instead, fusion welding, soldering, brazing, adhesive bonding, and the similar techniques may be applied into closely mating surfaces of the upper and lower components 4, 5, more specially, into between the outward surface 24 of the first end plate 41 of the upper component 4 and the mating inward surface 21 of the second end plate 31 of the lower component 5 as well as into between mating surfaces 40, 30 of the upper and lower components 4, 5, which come into close contact with one another. It will be also appreciated that any mechanical fasteners such as threaded fasteners or the like will be available to join together the upper and lower components 4, 5.

The linear motion guide unit constructed as stated earlier in the first version of the present invention is of the sort in which the guide rail 1 is formed in a U-shape in transverse section looked like a trough opened upwards. The guide rail 1 is composed of a pair of the lengthwise sides 6 spaced away widthwise from one another, and the bottom 7 joined lengthwise thereof together with the sides 6 to form a lengthwise trough of U-shape in transverse section. The lengthwise sides 6 are made on their inward surfaces 59 thereof with the raceway grooves 12. The guide rail 1 is made with bolt holes 48 that are used to fasten the guide rail 1 to a stationary member such as a machine bed, base, machine frame and so on. A bottom surface of the guide rail 1 is finished to serve as a lower reference surface 46 while any one of widthwise opposing side surfaces of the guide rail 1 is also expected to provide a side reference surface 47. The slider 2 fits for reciprocating movement relatively to the guide rail 1 into the recess 57 defined between sides 6 in a way sinking mostly in the recess 57.

With the linear motion guide unit constructed as stated earlier, the carriage 3 in the slider 2 is made of a material such as metal or the like rich in mechanical stiffness, and as seen in FIGS. 4 to 8 is provided on the top surface 49 thereof with a pair of first fore-and-aft recesses 28 spaced widthwise away from one another, and on the lower surface 50 thereof with a second fore-and-aft recess 29 lying widthwise midway of the lower surface 50. In other words, the carriage 3 is made on the top surface 49 thereof with a pair of the fore-and-aft recesses 28 to define a major middle land 51 lying between the fore-and-aft recesses 28 and strip lands 8 lying sidewise farther out of their associated fore-and-aft recesses 28. The carriage is further composed of a major middle portion 9 and fore-and-aft wings 10 extending downwards along breadthways opposite ends of the major middle portion 9 to define the second fore-and-aft recess 29 underneath the major middle portion 9 between widthwise opposing wing ends or the lower surfaces 50. The first fore-and-aft recesses 28 on the top surface 49 of the carriage 3 are envisaged coming into fit-engagement with first fore-and-aft conjunctive portions 42 of the upper component 4, which will be stated later. The second fore-and-aft recess 29 defined between widthwise opposing wings 10 is expected to fit over a second fore-and-aft conjunctive portion 32 of the lower component 5, which will be also recited later. The carriage 3 is also provided therein with the fore-and-aft return grooves 19 in order to form the return passages 20 in combination with the lower component 5. To this end, the return grooves 19 are made in the form of a quarter of a circle in cross section extending lengthwise of the carriage 3 along inside corners on the inward surface 58 of the wings 10 between which there is made the second fore-and-aft recess 29. On the sidewise opposing sides 17 of the carriage 3, there are cut the raceway grooves 26, one to each side, in opposition to the raceway grooves 12 cut in the guide rail 1. With the linear motion guide unit constructed as stated earlier, the raceway grooves 26 is made to complete the load-carrying races 15 in conjunction with their opposed raceway grooves 12, which allow the rolling elements 11 of balls to roll through there. The major middle land 51 of the carriage 3 has a mating surface 16 to mount any other parts such as workpiece and the like thereon. To this end, the mating surface 16 of the carriage 3 is finished to serve as upper reference surface 55 and made with threaded holes 13 that are used to fasten any other parts such as workpiece and the like to the slider 2. Any one of widthwise opposing side surfaces 17 of the carriage 3 is also expected to provide a side reference surface 43 to mount in place other parts such as workpiece and the like thereon. The carriage 3 constructed as stated earlier is made on the forward and aft ends 18 thereof with no fastener means including threaded holes, drilled holes, recesses, raised portions and the like as in the existing slider, but made even to help shrink the linear motion guide unit down as small as permitted in size.

Figure 9:
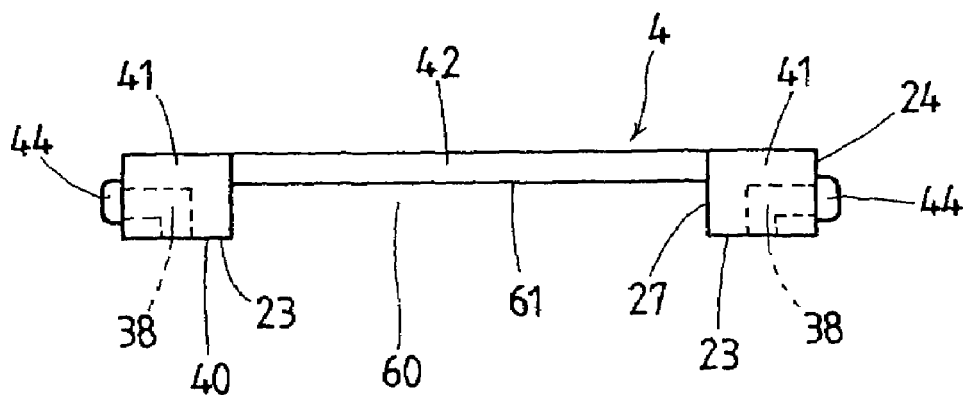
FIG. 9 is a view in front elevation of an upper component in the linear motion guide unit of FIG. 1.
Figure 10:
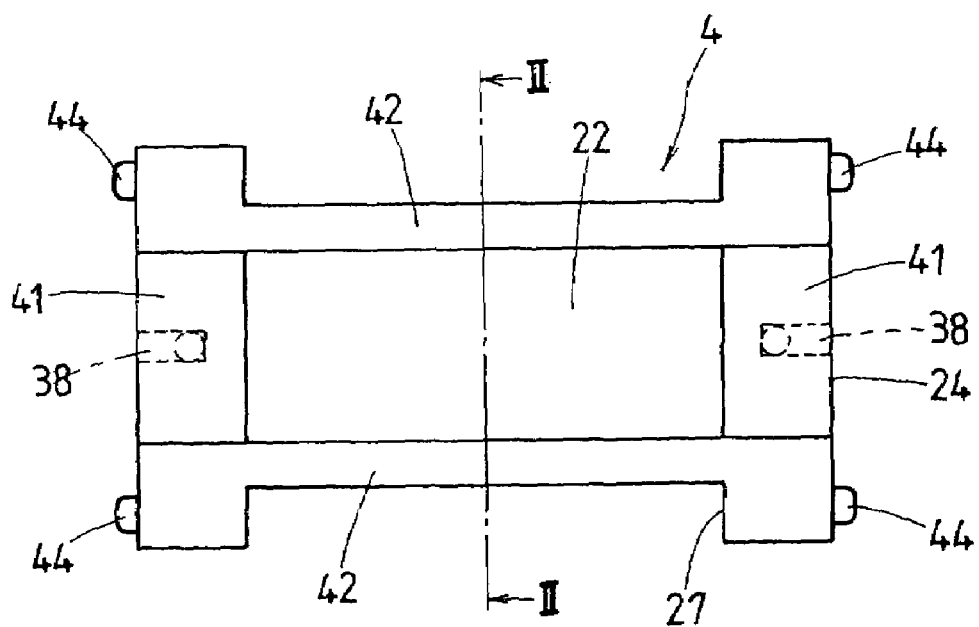
FIG. 10 is a top plan view of the upper component of FIG. 9.
Figure 11:
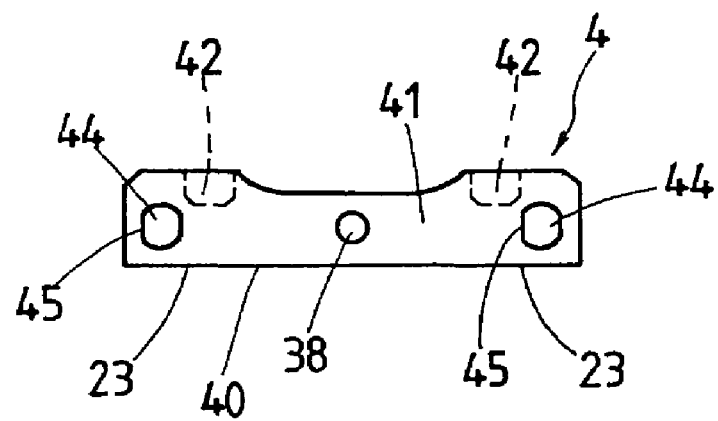
FIG. 11 is a view in side elevation of the upper component of FIG. 10.
Figure 12:
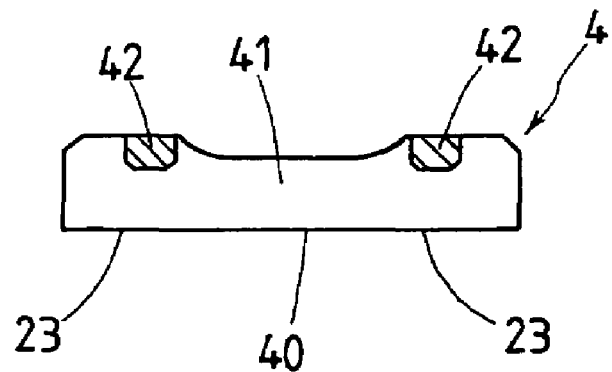
FIG. 12 is a view in transverse section of the upper component of FIG. 10, the view being taken along the plane of the line II-II of the figure.
Figure 13:
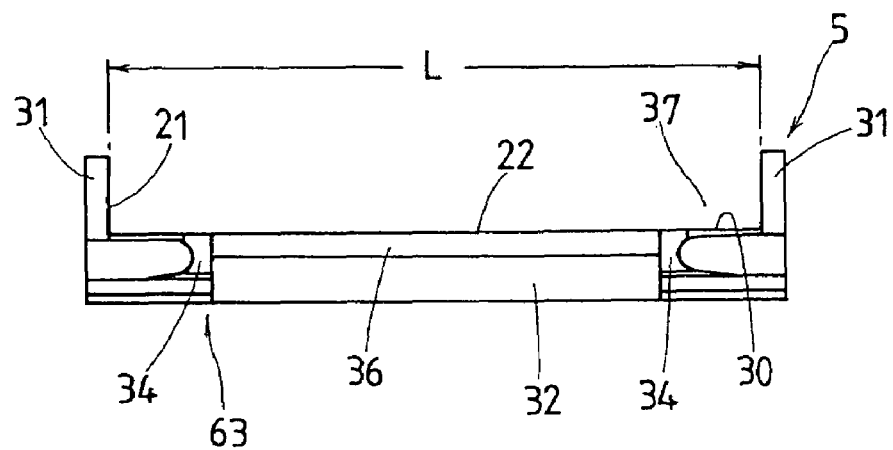
FIG. 13 is a view in front elevation of a lower component in the linear motion guide unit of FIG. 1.

The upper component 4 is made of synthetic resin and as seen in FIGS. 9 to 12 composed of forward and aft end plates 41 made so as to come into close engagement with the mating forward and aft ends 18 of the carriage 3, the forward and aft end plates 41 being make therein with the turnaround surfaces 23 to provide the turnaround passages 35, and a pair of fore-and-aft conjunctive portions 42 extended between the forward and aft end plates 41 and connected integral with the end plates 41 in a way allowed to fit into their associated recesses 28 of the carriage 3. The forward and aft end plates 41 have raised hooks or hook holes on their outward surfaces 24 to join the upper component 4 to the lower component 5. With the upper component 4 illustrated in FIGS. 9 and 10, the raised hooks 44 are shown on the forward and aft end plates 41. The raised hooks 44 on the upper component 4 is a cylindrical projections integral with the upper component 4, which are made together with the upper component 4 from synthetic resin in a single molding operation. As an alternative to the hooks 44 recited earlier, there may be provided another hooks 44 modified in specific contour as shown in FIG. 11, where a circle in cross section is partially cut away on diametrically opposite secant lines to have diametrically opposite flat surfaces 45. The modified hooks 44 of secant contour as stated just earlier is envisaged making it easier to design the mating surfaces of mold halves to form a mold cavity into which synthetic resin is poured or injected to produce the upper component 4 integral with the hooks 44. The forward and aft end plates 41 of the upper component 4 is made to complete the turnaround passages 35 in association with the lower component 5 to allow the rolling elements 11 turning round in rolling direction. With the embodiment discussed now, the lower component 5 is made with the turnaround grooves 34 as stated later in preparation for the turnaround passages 35. Thus, the turnaround passages 35 are completed in the slider 2 after the turnaround surfaces 23 made on the mating surface 40 of the end plates 41 have come into mating with their associated turnaround grooves 34. The upper component 4, as seen from FIG. 9, is made recessed at 60 when viewed in front elevation, which is defined with inward surfaces 27 of the forward and aft end plates 41 and lower surfaces 61 of the fore-and-aft conjunctive portions 42. On assembly of the slider 2, the upper component 4 first fits over the carriage 3 in a way embracing the carriage 3 inside the recess 60. The upper component 4, as seen from FIG. 10, is moreover made with a window 22 when viewed in plan, which is defined with the forward and aft end plates 41 and the fore-and-aft conjunctive portions 42. On assembly of the slider 2, the upper component 4 first fits over the carriage 3 in a way the window 22 fits over around the top surface 49 of the carriage 3. Moreover, the forward and aft end plates 41 of the upper component 4 are made at their widthwise middle thereof with lubricant paths 38, one to each end plate, which reach closed circuits 56 in the lower component to feed lubricant to the rolling elements 11 that run through the circuit 56.

The lower component 5 is made of synthetic resin and as seen in FIGS. 13 to 17 composed of forward and aft end plates 31 made so as to come into close engagement with outward forward and aft mating surfaces of the end plates 31 of the upper component 4, and a major portion 63 extending fore and aft to connect integrally with the forward and aft end plates 31. The major portion 63 of the lower component 5 includes therein turnaround areas 33 extended fore and aft beyond the ends 18 of the carriage 3 and joining to the associated end plates 31, and a conjunctive portion 32 expected to fit into the fore-and-aft recess 29 in the carriage 3. The turnaround areas 33 are each made therein with the turnaround grooves 34 that communicate with their associated load races 15, while the conjunctive portion 32 is made therein with return grooves 36 extended fore and aft to connect with the turnaround grooves 34. On assembly of the slider 2, the turnaround passages 35 associated with the load races 15 are completed after the turnaround areas 33 in the lower component 5 has been fitted together with the end plates 41 of the upper component 4 on their mating surfaces 30 and 40. The turnaround areas 33 in the lower component 4 is made with the turnaround grooves 34 of roughly semicircular contour in cross section, which is somewhat larger in diametral width and in depth than the rolling elements 11. The conjunctive portion 32 in the lower component 5 is made therein with return grooves 36 in conjunction with their associated turnaround grooves 34, which are envisaged forming the return passages 20. After the conjunctive portion 32 in the lower component 5 has fit into the recess 29 between the wings 10 of the carriage 3, the turnaround areas 33 come into close engagement at their inward ends 62 with their mating ends 18 of the carriage 3. Besides, the lower component 5 has claws 39 extending sidewise to intrude into the raceway grooves 12 on the guide rail 1 to scoop the rolling elements 11 out of the associated load races 15.

Figure 14:
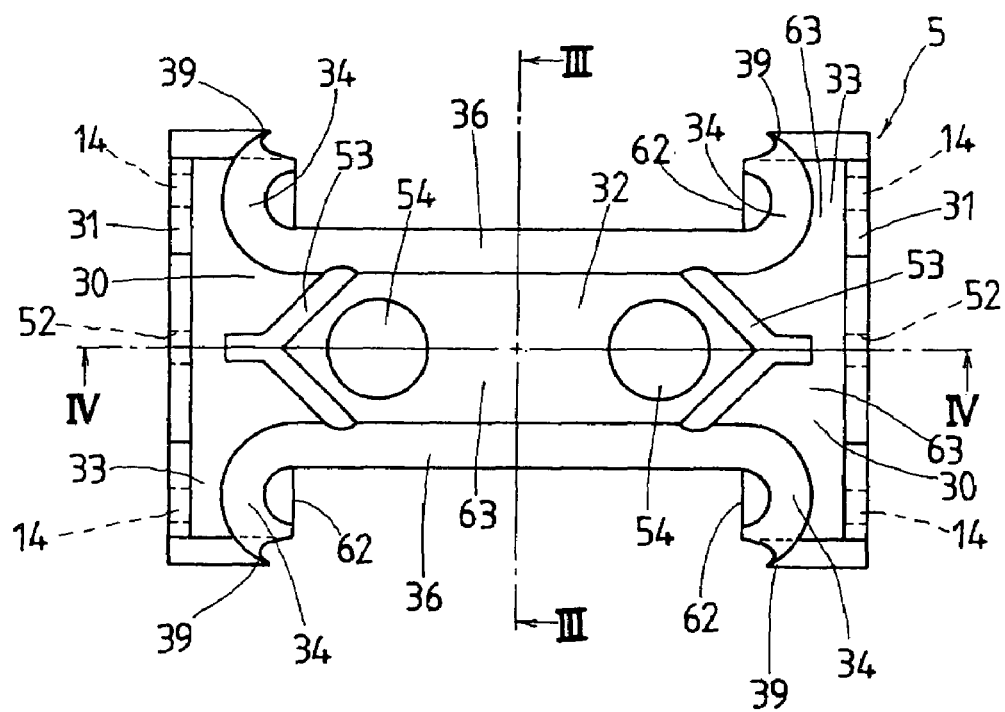
FIG. 14 is a top plan view of the lower component of FIG. 13.
Figure 15:
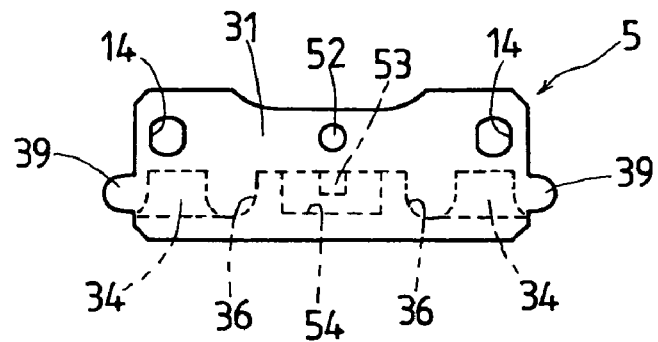
FIG. 15 is a view in side elevation of the lower component of FIG. 14.
Figure 16:
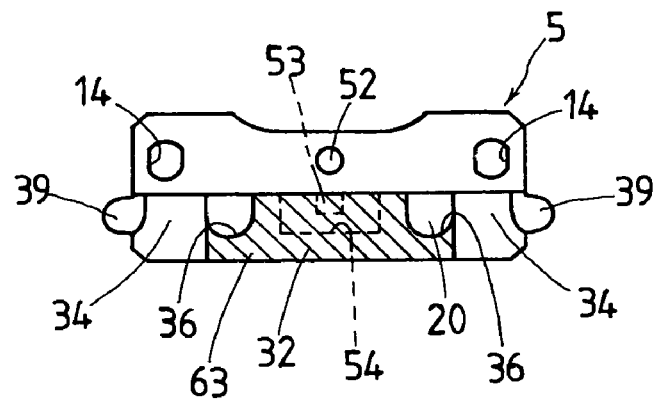
FIG. 16 is a view in transverse section of the lower component of FIG. 14, the view being taken along the plane of the line III-III of the figure.
Figure 17:
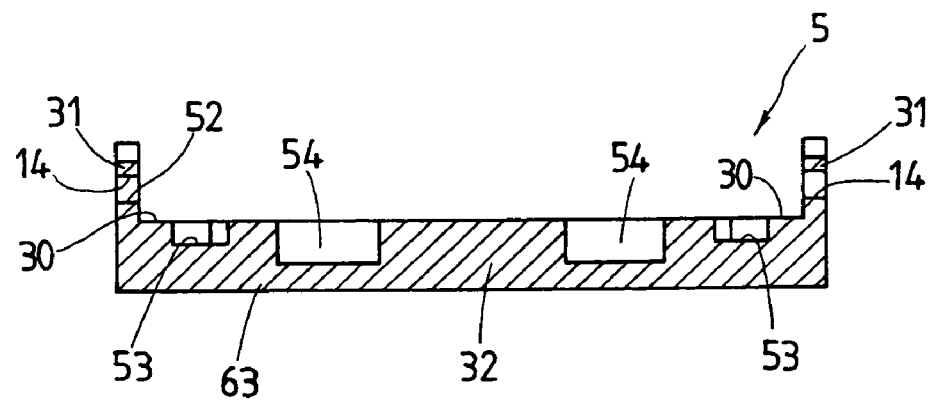
FIG. 17 is a view in lengthwise section of the lower component of FIG. 14, the view being taken along the plane of the line IV-IV of the figure.

On the end plates 31 of the lower component 5, there are made either hooks or hook holes in opposition to their complementary parts on the upper component 4 to join counterparts together with one another. In the version illustrated in FIG. 17, the lower component 5 is made with hook holes 14 of secant contour where a circle in cross section is partially cut away on diametrically opposite secant lines in conformity with the corresponding contour of the hooks 44 on the upper component 4. Nevertheless, it will be appreciated that the hook holes may be made in perfect circle in cross section. The return grooves 36 in the embodiment stated now, as shown in FIGS. 4 and 16, is made in roughly semicircular contour in cross section to get outward sides of the conjunctive portion 32 merging into the associated turn grooves 19 in the carriage 3. In the end plates 31 of the lower component 5, there are provided lubricant ports 52 that are connected with the lubricant paths 38 in the end plates 41 of the upper component 4, while the conjunctive portion 63 of the lower component 5, as shown in FIG. 14, is made therein with lubricant passages 53 that are made open to the return grooves 36, which is to provide the return passages 20 for the closed circuit where the rolling elements 11 are allowed to circulate through there. Moreover, the conjunctive portion 63 of the lower component 5, as shown in FIGS. 14 and 17, is made at the middle thereof with relief holes 54 that are located in alignment with the bolt holes 13 in the carriage 3. The relief holes 54, whether made bottomed or bottomless, have the advantage of keeping the tips of the fastening bolts against making contact or inroads into the conjunctive portion 63 of the lower component 5. On assembly of the upper component 4 with the lower component 5, the forward and aft end plates 31 of the lower component 5 are first made elastically warped to expand outwards a lengthwise distance (L) between them, and then allowed to return their initial attitude with their hook holes 14 fitting over the hooks 44 on the upper component 4.

How to build the carriage 3, upper component 4 and lower component 5 into the slider 2 will be explained later with reference to FIGS. 18 to 20. The upper component 4 is first applied from above to one surface or the top surface 49 of the carriage 3 to get the forward and aft end plates 41 of the upper component 4 engaging closely with their mating end plates 18 of the carriage 3 and at the same time to allow the fore-and-aft arms 42 to fit snugly into the fore-and-aft recesses 28 cut in the top surface 49 of the carriage 3. Then, the lower component 5 is applied from below to another surface or the bottom surface 50 of the carriage 3 to get the conjunctive portion 32 fitting into the fore-and-aft recess 29 in the carriage 3 and at the same time to bring the fore-and-aft end plates 31 of the lower component 5 into fit-engagement with the outwards surfaces 24 of the fore-and-aft end plates 31 in the lower component 5. On combining the upper component 4 with the lower component 5, the forward and aft end plates 31 of the lower component 5 are first made elastically warped to expand outwards a lengthwise distance (L) between their opposing inward surfaces, and then allowed to return their initial attitude with their hook holes 14 fitting over the hooks 44 on the upper component 4. The carriage 3, upper component 4 and lower component 5 are all joined together into the slider 2 according to the procedures of assembly as stated earlier. More than one rolling element 11 is finally introduced into the circulating circuit 56 to finish the linear motion guide unit. Meanwhile, the rolling elements 11 are introduced into the circulating circuit 56 while fitting the slider 2 into the guide rail 1 in order to keep the rolling elements 11 against falling away from the slider 2. As an alternative, any dummy guide rail is previously incorporated in the slider 2 instead of real one and slider 2 is later transferred from the dummy guide rail to real one. Instead, any retainer band may be used to keep the rolling elements 11 against falling away from the slider 2. With the embodiment constructed as stated earlier, although but there is provided no end seals to close any clearance left between the guide rail 1 and the slider 2, it will be appreciated that some rooms expected to accommodate the sealing means therein may be provided between the end plates 41 of the upper component 4 and the end plates 31 of the lower component 5.

A second embodiment of the linear motion guide unit according to the present invention will be hereinafter explained with reference to FIGS. 21 to 25 in which like and corresponding parts are referred to like reference characters suffixed with an alphabetic sign "C". To that extent, the previous description for the first embodiment stated earlier will be applicable to the second embodiment. One major difference between the first and second versions is that a guide rail 1C in the second embodiment is made of an elongated solid member roughly rectangular in cross section instead of the guide rail 1 in the first embodiment, which is made up of a pair of lengthwise sides 6 and a bottom 7 joined lengthwise thereof together with the sides 6 to form a lengthwise trough of U-shape in transverse section. Detailed description as for a carriage 3C, upper component 4C and lower component 4C of the slider 2C fitting over the guide rail 1C has been previously disclosed in the commonly assigned Japanese Patent Application No.2004-158813, published as JP 2005-337425 and therefore, the following description only with significant differences in construction.

The guide rail 1C has widthwise opposing sides 74 extending in lengthwise direction, on which are made first raceway grooves 12C, one to each side. A slider 2C fits over or conforms to the guide rail 1C for movement relative to the guide rail 1C and has second raceway grooves 26C in opposition to the first raceway grooves 12C. The guide rail 1C is also made so very small in size as in guide rail 1 of the first embodiment, for example 1 mm in width and 2.5 mm in height. More particularly, the slider 2C is distinctive be constituted with three components of a carriage 3C, upper component 4C and lower component 5C to reduce the component or parts in number and shrink the slider down to minuscule size. The upper and second components 4C, 5C fit over the carriage 3C in a way they grasp securely the carriage 3C between them with no fastening element including screws, threaded holes, hooks, hook holes, and so on, but just mutual conjugation made between the upper and lower components 4C, 5C. Meanwhile, the commonly assigned senior Japanese Patent Application No. 2004-158813, published as JP 2005-337425, recited above discloses the slider in which the upper and lower components are joined with one another by the conjoining means relying on only fit-engagement between them.

The second embodiment discussed now features that the upper and lower components 4C, 5C are joined securely together with using special conjoining means including for example staples piercing through the upper and lower components 4C, 5C to piece together them. As alternatives, fusion welding, soldering, brazing, adhesive bonding, and the similar techniques may be applied into closely mating surfaces 70 of the upper and lower components 4C, 5C, more specially, into at least some of mating regions provided between outward end surfaces 24C of forward and aft end plates 41C of the upper component 4C and inward end surfaces 21C of forward and aft end plates 31C of the lower component 5C or between mating surfaces 40C of the upper component 4C and mating surfaces 30C of the lower component 5C. It will be appreciated that any fasteners including screws, and so on may be selected to join upper and lower components 4C, 5C together.

The slider 2C is comprised of the carriage 3C having the raceway grooves 26C and first return grooves 19C that are expected to provide return passages 20C, the upper component 4C expected to fit over any one surface or a top surface 49C of the carriage 3C and made at forward and aft ends thereof with turnaround surfaces 23C to provide parts of turnaround passages 35C, and the lower component 5C expected to close from below another surface or a bottom surface 50C and made with turnaround grooves 34C to form the turnaround passages 35C in conjunction with the turnaround surfaces 23C and further made with second return grooves 36C to complete the return passages 20C in association with the first return grooves 19C. The upper component 4C extends along the carriage 3C to reach the lengthwise opposing ends 18C of the carriage 3C, and has fore-and-aft conjunctive portions 42C equivalent in length to the overall length of the carriage 3C and the end plates 41C integral with the fore-and aft conjunctive portions 42C at lengthwise opposite ends thereof to provide the turnaround surfaces 23C that are made communicated with the forward and aft ends of the raceway grooves 26C.

Figure 21:
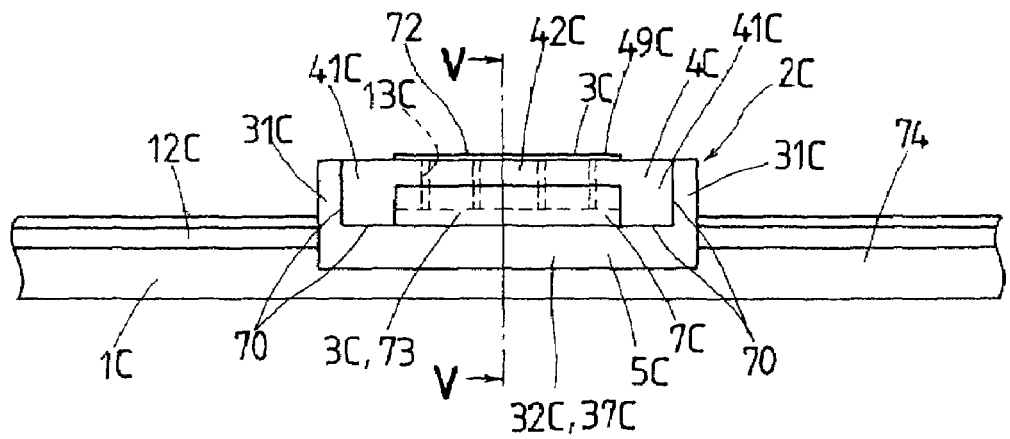
FIG. 21 is a front elevation, partly broken away, showing a second embodiment of a linear motion guide unit according to the present invention.
Figure 22:
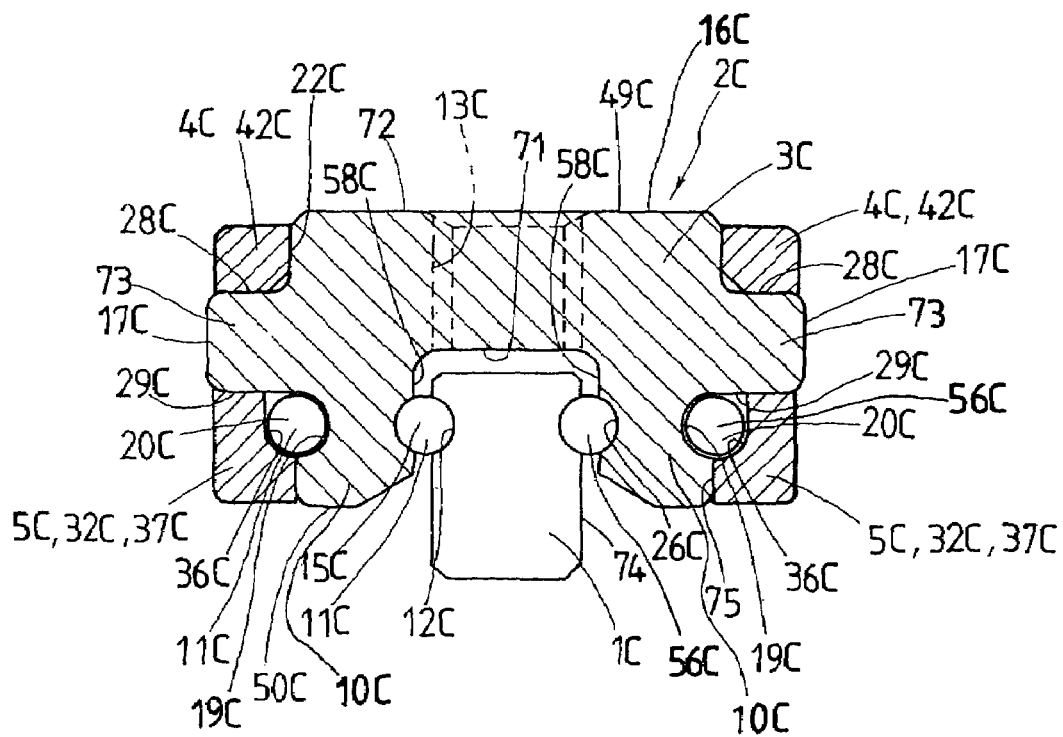
FIG. 22 is a view in transverse section of the linear motion guide unit of FIG. 21, the view being taken along the plane of the line V-V of the figure.
Figure 23:
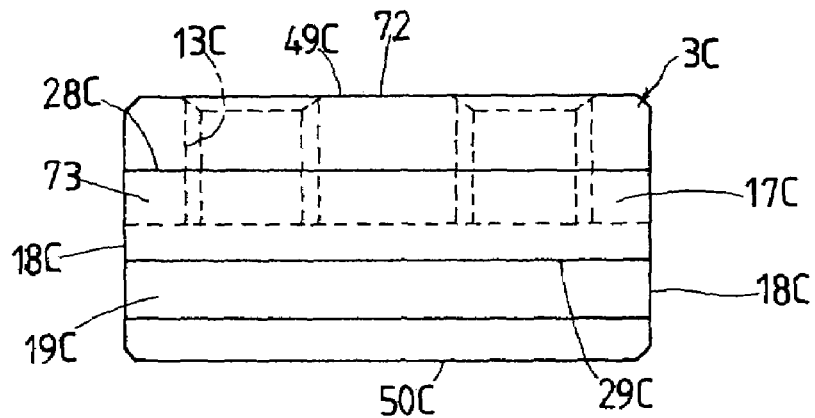
FIG. 23 is a view in front elevation of a carriage in the linear motion guide unit shown in FIG. 21.
Figure 24:
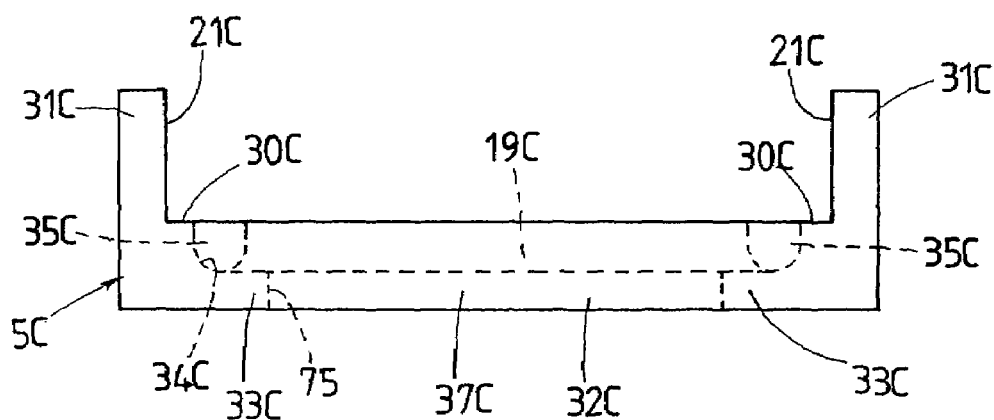
FIG. 24 is a view in front elevation of a lower component in the linear motion guide unit of FIG. 21.
Figure 25:
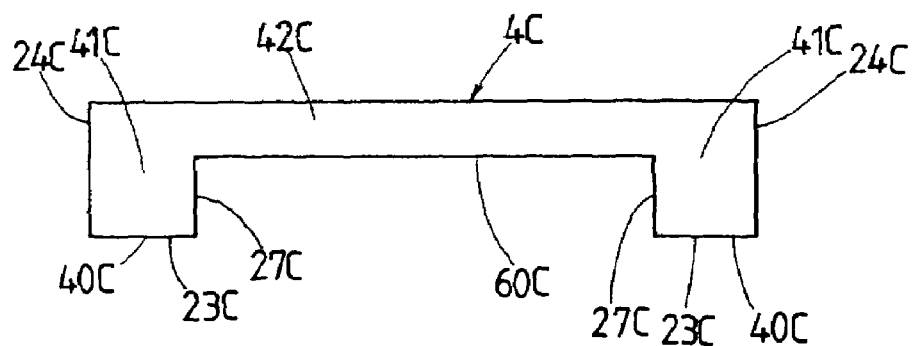
FIG. 25 is a view in front elevation of an upper component in the linear motion guide unit of FIG. 21.
Figure 26:
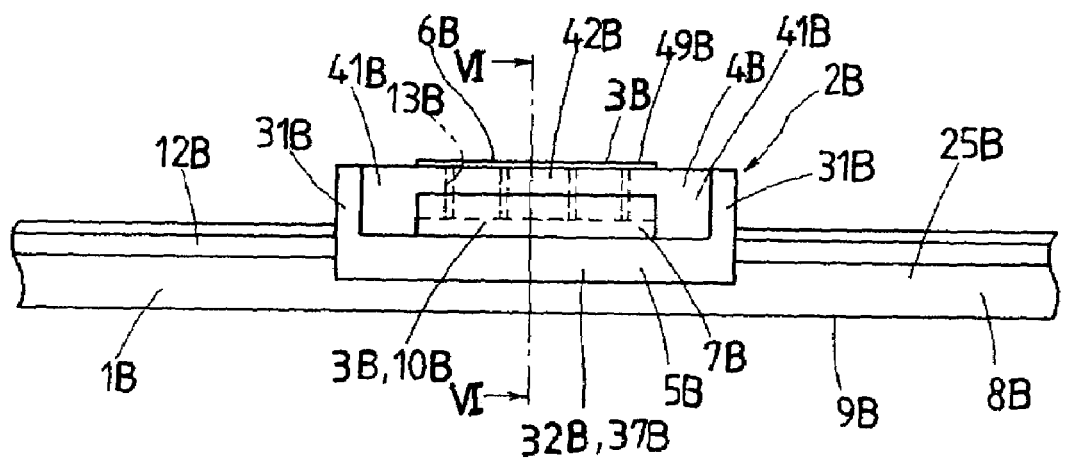
FIG. 26 is a front elevation, partly broken away, showing a third embodiment of a linear motion guide unit according to the present invention.
Figure 27:
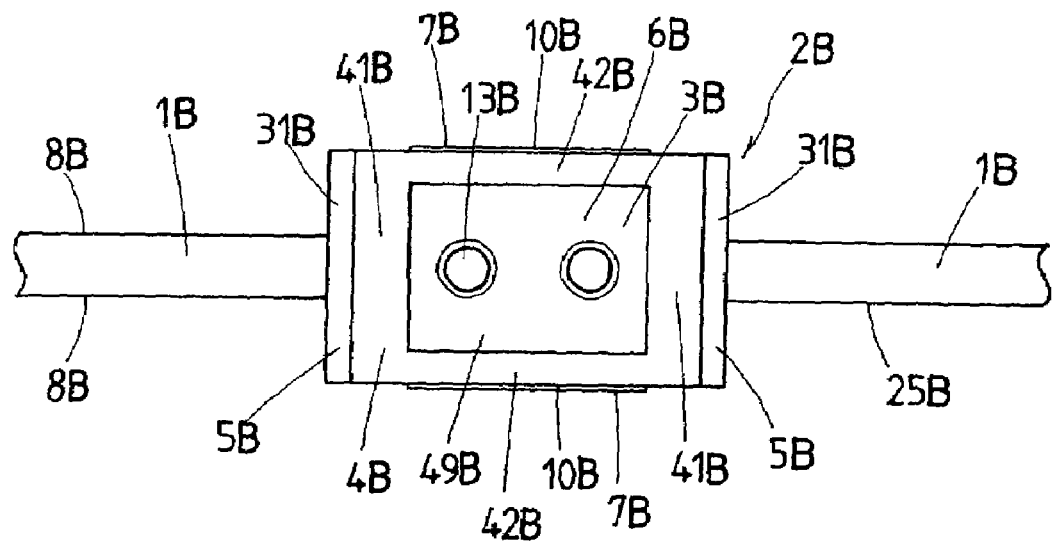
FIG. 27 is a top plan view, partly broken away, of the linear motion guide unit of FIG. 26.
Figure 28:
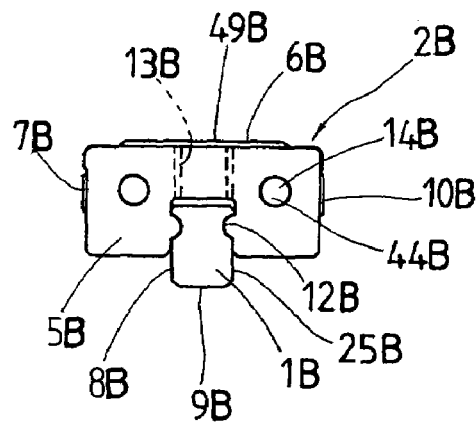
FIG. 28 is a view in side elevation of the linear motion guide unit of FIG. 26.

The carriage 3, as shown in FIGS. 21 and 22, is made at a widthwise middle area thereof with a fore-and-aft concave 71 into which the guide rail 1C fits for traveling movement relatively to the guide rail 1C. The carriage 3C is made on the top surface 49C thereof with first fore-and-aft recesses 28C spaced sidewise away from one another to extend fore and aft on widthwise opposite side edges of the carriage 3C in a way accommodating the conjunctive portions 42C of the upper component 4C therein. The carriage 3C is further made on the bottom surface 50C thereof with second fore-and-aft recesses 29C spaced sidewise away from one another to extend fore and aft on widthwise opposite side edges of the carriage 3C in a way receiving fore-and-aft conjunctive portions 32C of the lower component 5C. With the carriage 3 constructed as stated earlier, the return grooves 19C are cut deep in the fore-and-aft recesses 29C while the raceway grooves 26C are made on inward surfaces 58C around the fore-and-aft concave 71. Thus, the return grooves 19C are made in the widthwise opposite recesses 29C of the carriage 3C to open sidewise of the carriage 3C. The return grooves 19C are made semicircular in cross section by cutting deep the fore-and-aft recesses 29C to complete the return passages 20C where rolling elements 11C are allowed to roll through there. This construction as stated earlier of the return grooves 19C is also beneficial to help make production of the lower component 5C easier. The top surface 49C of the carriage 3C serves as an upper surface 72 of reference to provide a mounting surface 16C to install thereon any other object such as a workpiece and the like. In the top surface 49C of the carriage 3C, there are made threaded holes 13C that are used to fasten the workpiece or the like to the carriage 3. On both sides of the carriage 3, there are flanges 73 raised sidewise between the upper and lower recesses 28C, 29C. Forward and aft ends 18C of the carriage 3C are made with no fastening means including hooks, hook holes, threaded holes, and so on, but made entirely flat to come into the close engagement with their mating inward surfaces 27C of the upper component 4C.

The first member or upper component 4C is composed of a pair of the first end plates 41C expected lying in opposition to the forward and aft ends 18C of the carriage 3C, and a pair of the first fore-and aft conjunctive portions 42C extended between the end plates 41C and made integral with the end plates 41C. On the end plates 41C, there are made the turnaround surfaces 23C to provide parts of turnaround passages 35C. The upper component 4C is placed on the carriage 3C with the fore-and-aft conjunctive portions 42C fitting into their associated recesses 28C on the carriage 3C. The upper component 4C is made with a window 22C surrounded with the forward and aft end plates 41C and the fore-and-aft conjunctive portions 42C. Thus, the upper component 4C is combined with the carriage 3C in a way the top surface 49C of the carriage 3C fits into the window 22C of the upper component 4C. The upper component 4C is moreover made to have sidewise opposite recesses 60C defined inside the forward and aft end plates 41C and the fore-and-aft conjunctive portions 42C to fit over around the flanges 73 of the carriage 3C. After having laid the upper component 4C on the carriage 3 in a way the top surface 49C of the carriage 3C fits into the window 22C while the fore-and-aft conjunctive portions 42C comes into abutment against the flanges 73 of the carriage 3C to put the flanges 73 between the upper and lower components 4C and 5C, the mating surfaces 40C of the end plates 41C come into close engagement with the mating surfaces 30C of the lower component 5C whereby the turnaround surfaces 23C formed on the bottom of the end plates 41C of the upper component 4C is brought into combination with their associated turnaround grooves 34C cut in turnaround areas 33C of the fore-and-aft conjunctive portions 32C of the lower component 5C to complete the turnaround passages. Moreover, the forward and aft end plates 41C of the upper component 4C are each made at widthwise middle thereof with a fore-and-aft concave in alignment with the concave 71 in the carriage 3C to fit over or conform to the guide rail 1C.

The second member or lower component 5C is composed of a pair of second forward and aft end plates 31C and a pair of second fore-and-aft conjunctive portions 32C spaced sidewise away from one another and integral with the forward and aft end plates 31C. The end plates 31C of the lower component 5C are arranged in such a relation that their inward surfaces 21C are allowed to come into closely mutual engagement with the outward surfaces 24C of the end plates 41C of the upper component 4C. The fore-and aft conjunctive portions 32C of the lower component 5C are made to fit snugly into the fore-and-aft recesses 29C, which are made by cutting away partially the bottom surface 50C of the carriage 3C. The fore-and-aft conjunctive portions 32C of the lower component 5C includes therein turnaround areas 33C extended fore and aft beyond the ends 18C of the carriage 3C and made therein with the turnaround grooves 34C leading to their associated load races 15C, and lengthwise intermediate portions 37C extended between the forward and aft turnaround areas 33C to fit into the fore-and-aft recesses 29C cut in the carriage 3C, the lengthwise intermediate portions 37C being made therein with the raceway grooves 36C extending between the turnaround areas 33C. The lower component 5C is moreover made with a window 75, which is surrounded with the forward and aft turnaround areas 33C and the lengthwise intermediate portions 37C. Upon assembly, the other surface or the bottom surface 50C of the carriage 3C is allowed to fit into the window 75 of the lower component 5C.

With the linear motion guide unit of the second version constructed as stated earlier, upon assembly of the carriage 3C together with the upper and lower components 4C and 5C, the mating surfaces 30C provided on the fore-and-aft conjunctive portions 32C merging with the end plates 31C of the lower component 5C come into close engagement with the mating surfaces 40C on the bottom surfaces of the end plates 41C of the upper component 4C while the carriage 3C is held confined at the flanges 73 inside the recesses 60C that are closed from below with the fore-and-aft conjunctive portions 62C of the lower component 5C. Then, only the upper and lower components 4C, 5C are joined together by using any fastener means to keep all the carriage 3C, upper component 4C and the lower component 5C in mutual combination. The fore-and-aft conjunctive portions 32C of the lower component 5C are made at the forward and aft ends thereof with the turnaround areas 33C to provide the turnaround passages 35C in combination with the upper component 4C. The lengthwise intermediate portions 37C to connect the turnaround areas 33C with the lengthwise opposite ends of the fore-and-aft conjunctive portions 32C are made integral with the turnaround areas 33C. The lengthwise intermediate portions 37C for the fore-and-aft conjunctive portions 32C are made therein with the return grooves 36C. With the second embodiment constructed as stated earlier, the return grooves 36C are made in the form of a quarter of a circle in cross section. The lower component 5C is made with the window 75, which is surrounded with the forward and aft turnaround areas 33C and the sidewise opposite conjunctive portions 32C. Upon assembly, the other surface or the bottom surface 50C of the carriage 3C is allowed to fit from below into the window 75 of the lower component 5C. Moreover, the lower component 5C is made concaved at areas between the forward and aft end plates 31C and their associated turnaround areas 33C in alignment with the concave 71 in the carriage 3C to allow the lower component 5C to fit over or conform to the guide rail 1C.

A third version of the linear motion guide unit according to the present invention will be explained hereinafter with reference to FIGS. 26 to 41.

The third version is also envisaged performing the same technical concept found in the first version of the present invention. Thus, like and corresponding parts to perform the identical function with the first version as stated earlier are referred to like reference characters suffixed with an alphabetic sign "B".

The linear motion guide unit constructed according to the third version of the present invention is in general comprised of a guide rail 1B made on widthwise opposing sides 25B thereof with first raceway grooves 12B, one to each side, a slider 2B fitting over and conforming to the guide rail 1B for movement relatively to the guide rail 1B and made with second raceway grooves 26B in opposition to the first raceway grooves 12B to define load races 15B between them, and more than one rolling element 11B allowed to roll through the load races 15B. The slider 2B is provided therein with return passages 20B and turnaround passages 35B that are each connected at one end thereof with the associated return passage 20B, while at another end thereof with the associated load race 15B, thereby allowing the rolling elements 11B to circulate through there. In other words, the recirculating circuit allowing rolling elements 11B to run through there is made up of the load race 15B, one turnaround passage 35B, return passage 20B and the other turnaround passage 35B.

The guide rail 1B is made very small in dimension, for example 1 mm in width and 2.5 mm in height. The guide rail 1B, when made too small in size, could have less space thereon to form any hole that is used to fasten the guide rail 1B to any other object such as a machine bed and the like. The miniaturized guide rail 1B has to be mounted on any fixed object by drawing upon either any portion having nothing to do with effective traveling stroke or fusion welding, soldering, adhesive, and similar techniques. The guide rail 1B has a bottom surface 9B of reference and a side surface 8B of reference, which are used to mount with accuracy the guide rail 1B to any other fixed counterpart including a machine bed, fixed frame, and so on. In contrast, the slider 2B has a top surface 6B of reference and a side surface 7B of reference, both of which are used to mount with accuracy the slider 2B to any other member such as a workpiece and the like. The top surface 6B and the side surface 7B are somewhat raised above their associated upper surface and side surface of an upper component and a lower component, described in detail later, to provide an upper surface 49B and a side surface 17B, respectively.

The slider 2B is constituted with three components of a carriage 3B, first member of upper component 4B, and second member or lower component 5B.

The upper and lower components 4B, 5B fit over the carriage 3B in a way they grasp securely the carriage 3B between them to join the three components together with one another. The carriage 3B has no fastening element including screws, threaded holes, hooks, hook holes, and so on. Thus, the three components to build the slider 2B are joined together with no help of any fasteners, but with only fit-engagement of the upper component 4B with the lower component 5B. That is, there is no need of the provision of any fastening means including threaded holes, engaging parts complementary to each other, and similar elements on the carriage 3B to finish the slider 2B, as opposed to the conventional fastening techniques for building the slider. Forward and aft ends 18B of the carriage 3B are thus made with no additional fastening means to join the upper and lower components 4B, 5B thereon, but made entirely flat. In the context of the third version of the present invention, although the first member is referred to the upper component while the second member is referred to the lower component, it is to be noted that the terms "upper" and "lower" employed herein are not of intention to limit "upper" or "lower" in geometry, but for the purpose of much understanding of invention in compliance with the drawings.

More specially, the slider 2B is comprised of the carriage 3B made with the raceway grooves 26B and further return grooves 19B for the provision of return passages 20B, the upper component 4B disposed on any one surface or the upper surface 49B of the carriage 3B and made with forward and aft turnaround surfaces 23B to form in part the turnaround passages 35B, and the lower component 5B located on the other surface or a lower surface 50B of the carriage 3B and made with turnaround grooves 34B to form the turnaround passages 35B in conjunction with the turnaround surfaces 23B, the lower component 5B being further made with second return grooves 36B to form return passages 20B in association with the return grooves 19B. The upper component 4B extends along the carriage 3B to reach the lengthwise opposing ends 18B of the carriage 3B, and more specially has fore-and aft conjunctive portions 42B equivalent in length to the overall length of the carriage 3B and the end plates 41B having the turnaround surfaces 23B integral with the fore-and aft conjunctive portions 42B at lengthwise opposite ends thereof. The turnaround surfaces 23B of the upper component 4B are made to communicate with forward and aft ends of the raceway grooves 26B in the carriage 3B, one to each end. With the linear motion guide unit constructed as stated earlier, the upper and lower components 4B, 5B are allowed to join together with one another by the help of fit-engagement of hooks 44B or raised parts on any one of the mating components with hook holes 14B or complementary parts on the other component. In the version discussed now, the upper component 4B has the hooks 44B while the lower component 5B has the hook holes 14B.

With the linear motion guide unit of the third version, the carriage 3B, as shown in FIGS. 29 to 32, is made at a widthwise middle area thereof with a fore-and-aft concave 27B into which the guide rail 1B fits for traveling movement relatively to the guide rail 1B. The carriage 3B is made on the top surface 49B thereof with first fore-and-aft recesses 28B spaced sidewise away from one another to extend fore and aft on widthwise opposite side edges of the carriage 3B in a way accommodating the conjunctive portions 42B of the upper component 4B therein. The carriage 3B is further made on the bottom surface 50B thereof with second fore-and-aft recesses 29B spaced sidewise away from one another to extend fore and aft on widthwise opposite side edges of the carriage 3B in a way receiving fore-and-aft conjunctive portion 32B of the lower component 5B. With the carriage 3B constructed as stated earlier, the return grooves 19B of the carriage 3B are cut deep in the foreand-aft recesses 29B to be made open outwards while the raceway grooves 26B are cut into the inward surface of the concave 27B. That is, the return grooves 19B are cut into the widthwise opposite recesses 29B so as to open sidewise outward. The return grooves 19B are made semicircular in cross section by cutting deep the fore-and-aft recesses 29B to complete the return passages 20B where rolling elements 11B are allowed to roll smoothly through there. This construction as stated earlier of the return grooves 19B is also beneficial to help make production of the lower component 5B easier. The top surface 49B of the carriage 3B serves as a top surface 6B of reference to provide a mounting surface 16B to install thereon any other object such as a workpiece and the like. In the top surface 16B of the carriage 3B, there are made threaded holes 13B that are used to fasten the workpiece or the like to the carriage 3B. On both sides of the carriage 3B, there are flanges 10B raised sidewise between the upper and lower recesses 28B, 29B to define outward sides 17B, any one of which is made to provide the side surface 7B of reference. Forward and aft ends 18B of the carriage 3B are made with no fastening means including hooks, hook holes, threaded holes, any raised parts and their complementary parts, and so on, but made entirely flat to come into the close engagement with their mating inward surfaces 51B of the upper component 4B.

The first member or upper component 4B, as shown in FIGS. 37 to 41, composed of a pair of first forward and aft end plates 41B made so as to come into close engagement with the mating forward and aft ends of the carriage 3B, and a pair of first fore-and-aft conjunctive portions 42B extended between the forward and aft end plates 41B and connected integral with the end plates 41B. The forward and aft end plates 41B are made therein with the turnaround surfaces 23B to provide in part the turnaround passages 35B. The upper component 4B is laid from above on the carriage 3B with the fore-and-aft conjunctive portions 42B fitting into their associated recesses 28B cut in the carriage 3B. The upper component 4B is made with a first window 47B surrounded with the forward and aft end plates 41B and the fore-and-aft conjunctive portions 42B. Thus, the upper component 4B is combined with the carriage 3B in a way the upper surface 49B of the carriage 3B fits into the window 47B of the upper component 4B. The forward and aft end plates 41B are made on their outward surfaces 24B thereof with any one of mutually fitting parts complementary to one another to join the upper component 4B together with the lower counterpart 5B, or the hooks 44B raised above the end plates 41B in the illustrated version. The turnaround surfaces 23B on the forward and aft end plates 41B are expected to form the turnaround passages 35B in conjunction with the turnaround grooves 34B in the lower component 5B described later.

Figure 37:
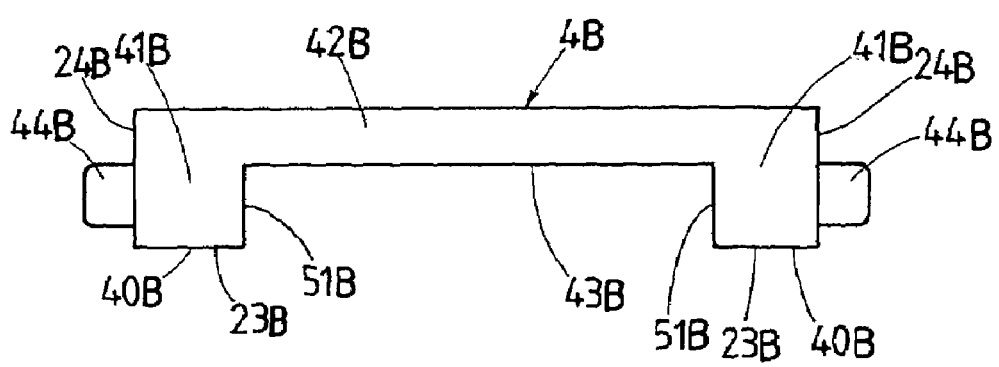
FIG. 37 is a view in front elevation of an upper component in the linear motion guide unit of FIG. 26.
Figure 38:
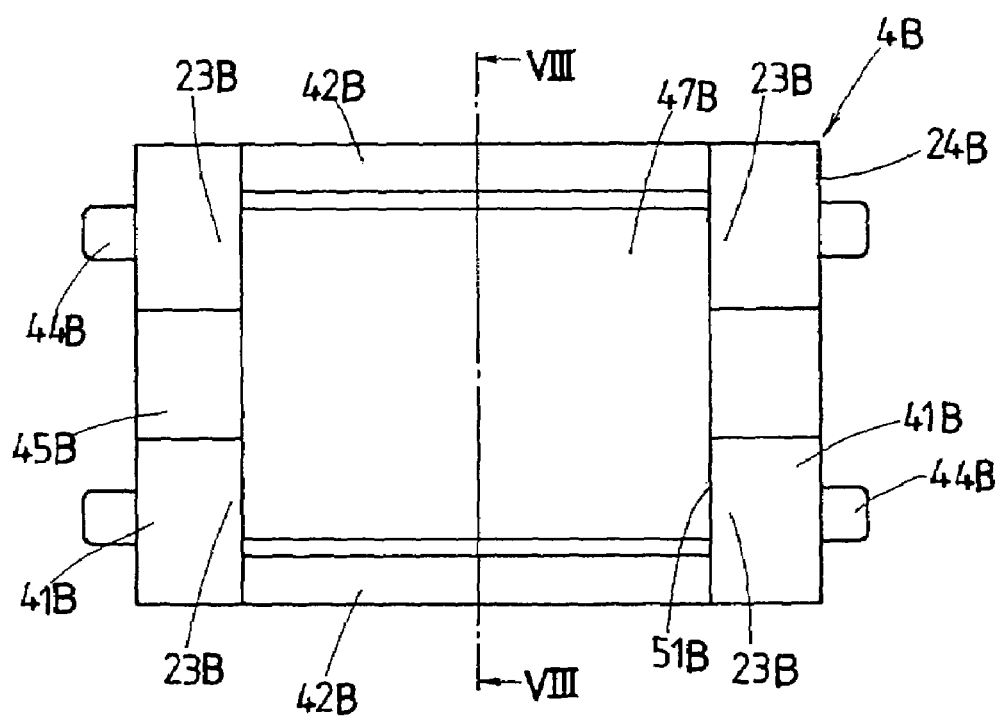
FIG. 38 is a view in bottom of the upper component of FIG. 37.
Figure 39:
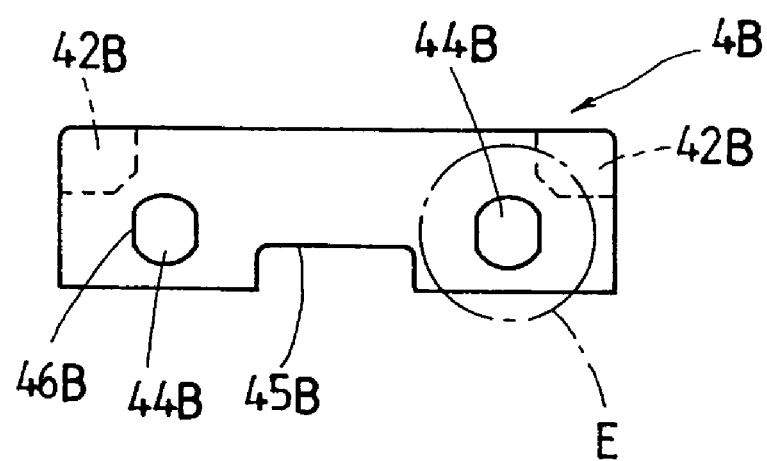
FIG. 39 is a view in side elevation of the upper component of FIG. 38.
Figure 40:
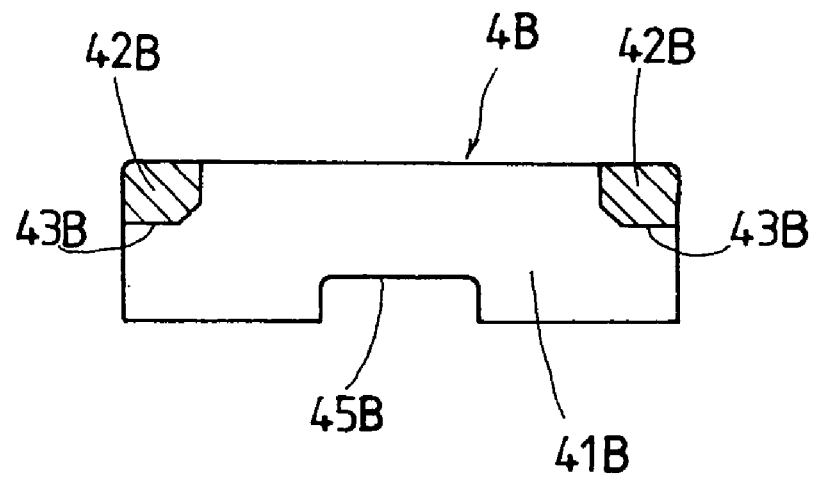
FIG. 40 is a view in transverse section of the upper component of FIG. 38, the view being taken along the plane of the line VIII-VIII of the figure.
Figure 41:
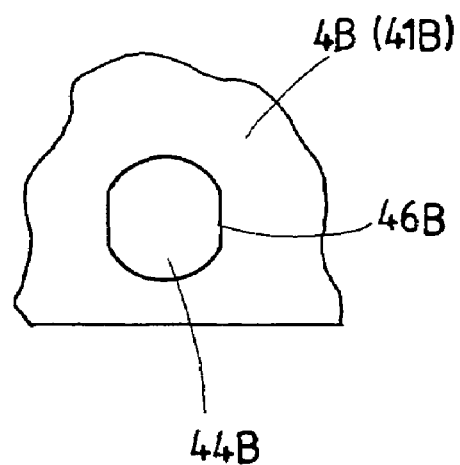
FIG. 41 is an enlarged fragmentary view in side elevation of an area encircled with sign (E) in the upper component of FIG. 39.

The upper component 4B, as shown in FIG. 37, is made recessed at 43B when viewed in front elevation, which is defined with the forward and aft end plates 41B and the fore-and-aft conjunctive portions 42B to embrace or fit over the flanges 10B of the carriage 3B. The upper component 4B, as seen from FIG. 38, is moreover made with the window 47B when viewed in plan, which is defined with the forward and aft end plates 41B and the fore-and-aft conjunctive portions 42B. After having laid the upper component 4B on the carriage 3B in a way the top surface 49B of the carriage 3B fits into the window 47B while the fore-and-aft conjunctive portions 42B comes into abutment against the flanges 10B of the carriage 3B to put the flanges 10B between the upper and lower components 4B and 5B, the turnaround surfaces 23B on the bottom of the end plates 41B of the upper component 4B is brought into conjunction with their associated turnaround grooves 34B cut in turnaround areas 33B in the fore-and-aft major portions 32B of the lower component 5B to complete the turnaround passages 35B. On each outward surface 24B of forward and aft end plates 41B of the upper component 4B, there is a pair of raised hooks 44B envisaged making it possible to join firmly the upper and lower components 4B, 5B with each other. The raised hooks 44B on each end plate 41B of the upper component 4B are disposed in a way spaced sidewise away from one another make ensure secure connection between the upper and lower components 4B, 5B. Each raised hook 44B is designed in a specific contour as shown in FIGS. 39 and 41, where a circle in cross section is partially cut away on diametrically opposite secant lines to have diametrically opposite flat surfaces 46B. This hook 44B of secant contour as stated just earlier is envisaged making it easier to form a mold cavity into which synthetic resin is poured to produce the upper component 4B integral with the hooks 44B. Moreover, the forward and aft end plates 41B of the upper component 4B are each made at widthwise middle thereof with a fore-and-aft concave 45B in alignment with the concave 27B in the carriage 3B to fit over or conform to the guide rail 1B.

The second member or lower component 5B, as seen in FIGS. 33 to 36, composed of second forward and aft end plates 31B, and a pair of second conjunctive portions 32B spaced sidewise away from one another and each extended fore and aft to connect integrally with the forward and aft end plates 31B. The forward and aft end plates 31B of the lower component 5B are made to come into close engagement at their inward surfaces 21B with outward surfaces 24B of the forward and aft end plates 41B of the upper component 4B. The forward and aft end plates 31B are provided therein with any one of mutually complementary parts to join together the upper and lower components 4B, 5B. In the embodiment illustrated here, the hook holes 14B are made in the forward and aft end plates 31B in opposition to the mating hooks 44B raised on the upper component 4B. The fore-and-aft conjunctive portions 32B of the lower component 5B are expected to fit into the fore-and-aft recesses 29B cut into the bottom surface 50B of the carriage 3B. The second conjunctive portions 32B extends along the carriage 3B beyond outwards the lengthwise opposing ends 18B of the carriage 3B, and includes therein the forward and aft turnaround areas 33B where there are made the turnaround grooves 34B, and lengthwise intermediate portions 37B envisaged fitting into the fore-and-aft recesses 29B in the carriage 3B and made therein with the return grooves 36B extending between the forward and aft turnaround areas 33B. With the lower component 5B constructed as stated earlier, moreover, there is made open a second window 38B that extends fore and aft through between the widthwise opposite intermediate portions 37B as well as between the widthwise opposite turnaround areas 33B. Thus, the lower component 5B is allowed to fit over or conform to the bottom surface 50B of the carriage 3B.

Figure 29:
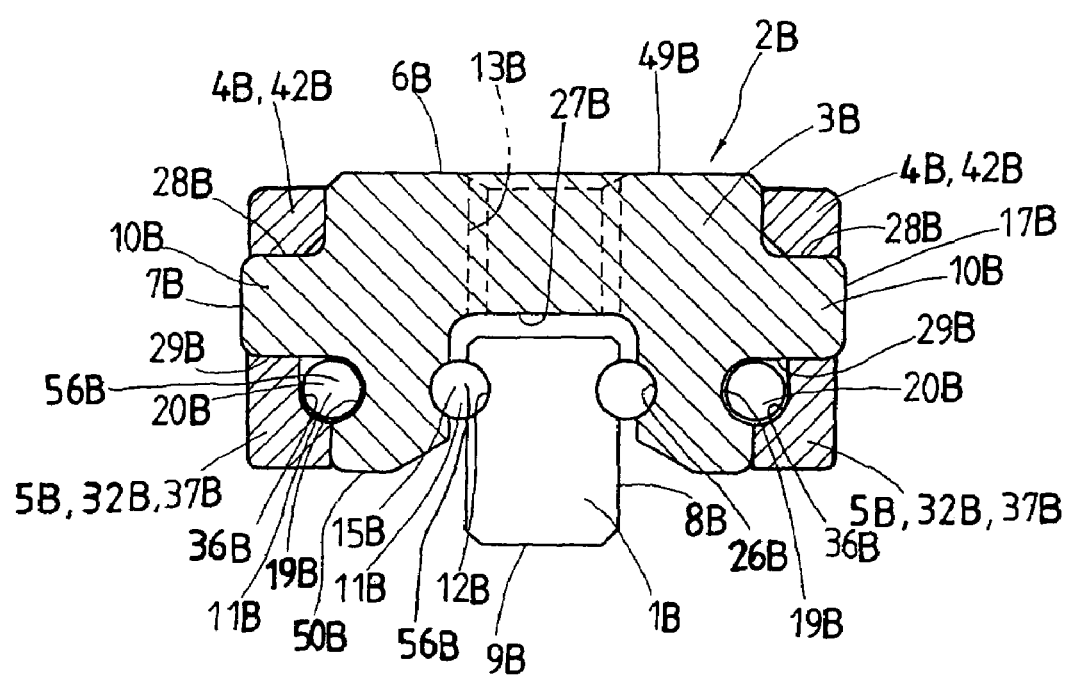
FIG. 29 is a view in transverse section of the linear motion guide unit of FIG. 26, the view being taken along the plane of the line VI-VI of the figure.
Figure 30:
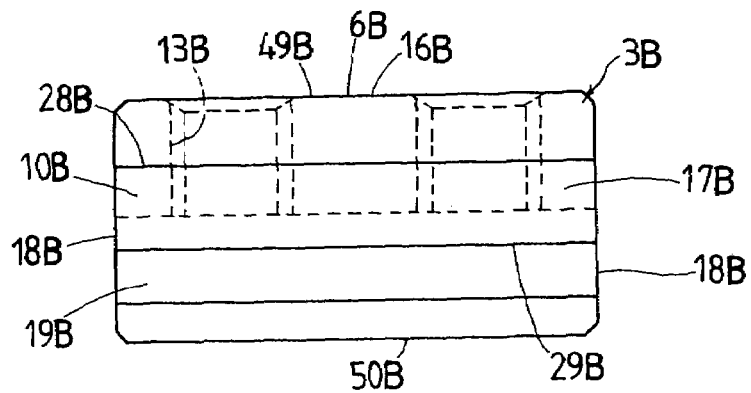
FIG. 30 is a view in front elevation of a carriage for the linear motion guide unit of FIG. 26.
Figure 31:
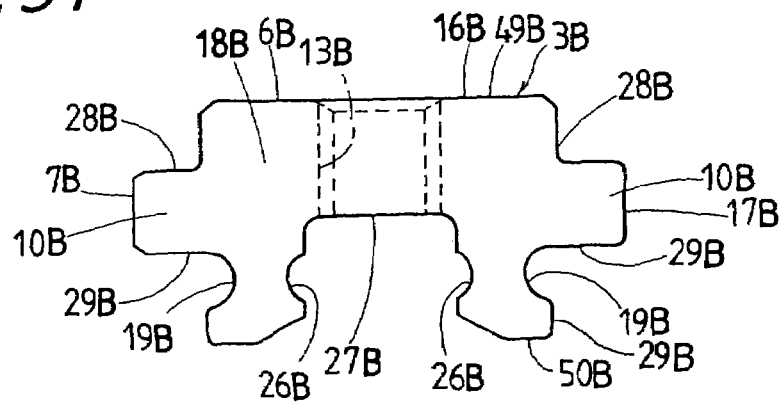
FIG. 31 is a view in side elevation of the carriage of FIG. 30.
Figure 32:
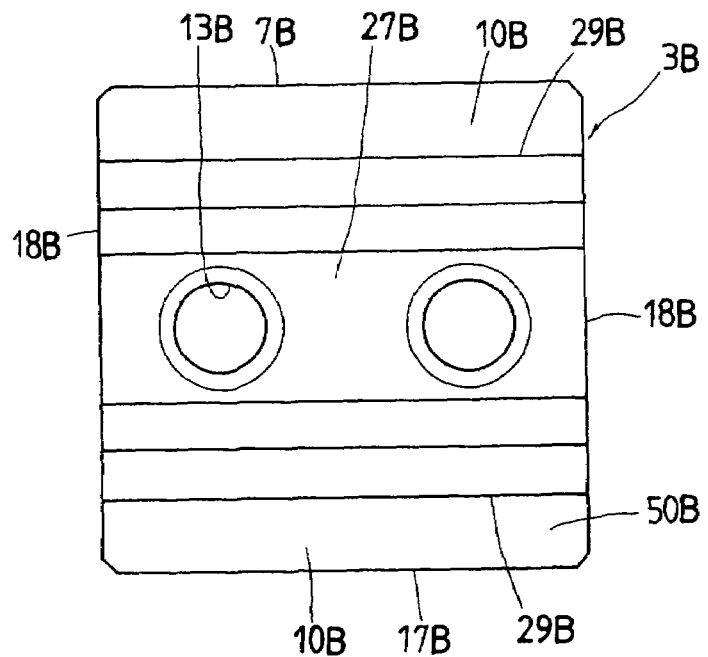
FIG. 32 is a view in bottom of the carriage shown in FIG. 30.
Figure 33:
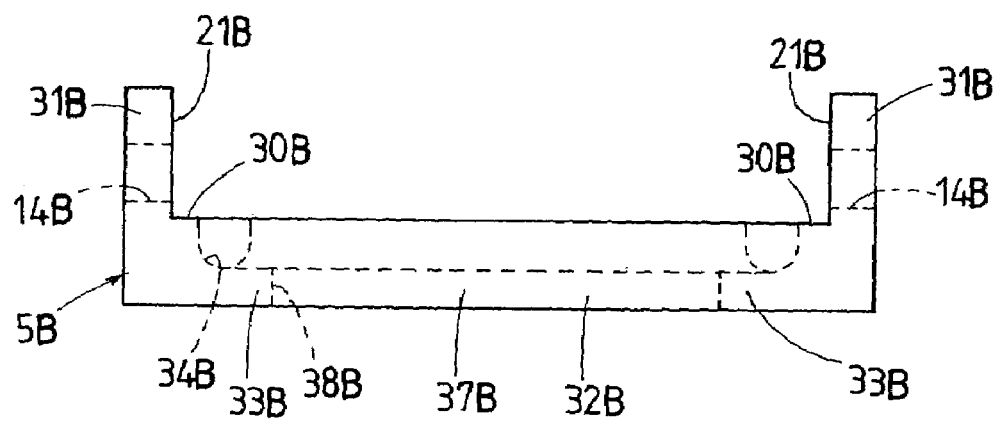
FIG. 33 is a view in front elevation of a lower component for the linear motion guide unit of FIG. 26.
Figure 34:
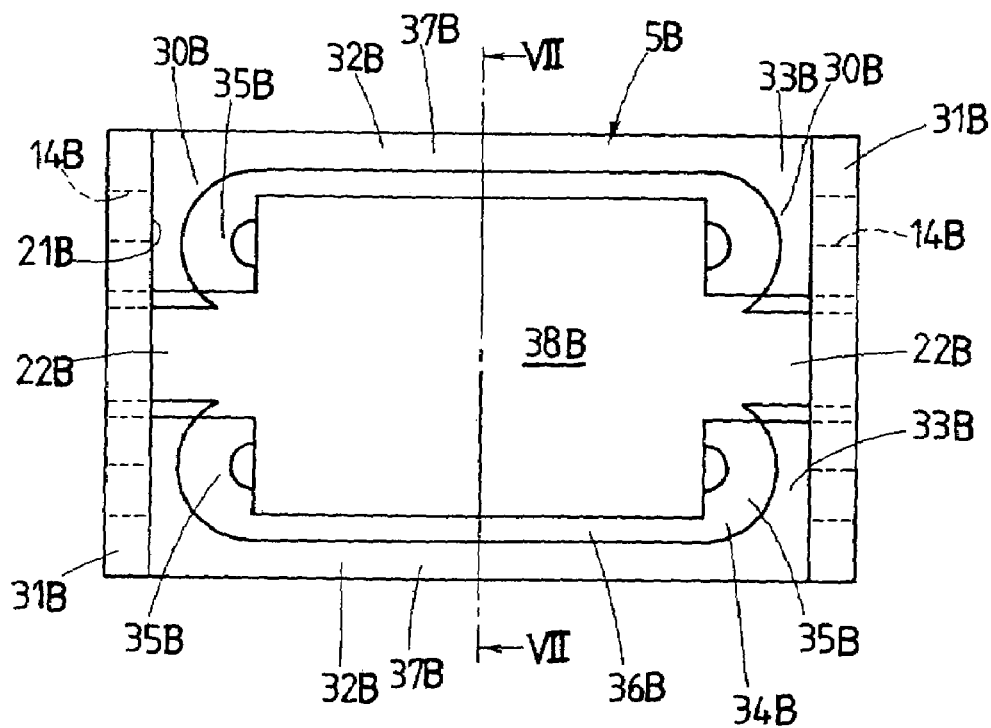
FIG. 34 is a top plan view of the lower component of FIG. 33.
Figure 35:
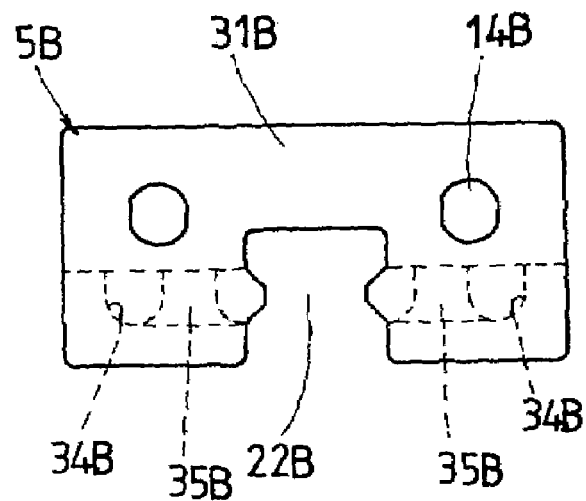
FIG. 35 is a view in side elevation of the lower component of FIG. 34.
Figure 36:
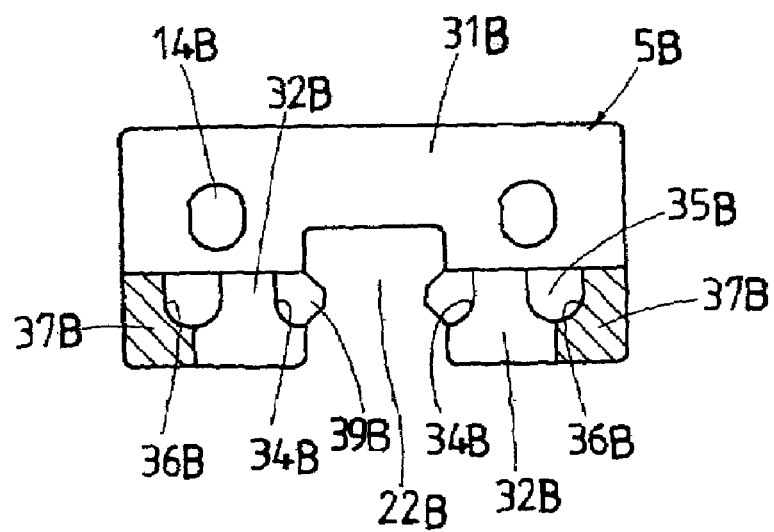
FIG. 36 is a view in transverse section of the lower component of FIG. 34, the view being taken along the plane of the line VII-VII of the figure.

With the linear motion guide unit of the third version constructed as stated earlier, upon assembly of the carriage 3B together with the upper and lower components 4B and 5B, the mating surfaces 30B provided on the second conjunctive portions 32B merging with the end plates 31B of the lower component 5B come into close engagement with the mating surfaces 40B on the bottom surfaces of the end plates 41B of the upper component 4B while the carriage 3B is held confined at the flanges 10B inside the recesses 43B that are closed from below with the second conjunctive portions 32B of the lower component 5B. The second conjunctive portions 32B of the lower component 5B includes therein the forward and aft turnaround areas 33B to complete the turnaround passages 35B, and the lengthwise intermediate portions 37B integral at their forward and aft ends thereof with the turnaround areas 33B to connect them together with one another. In the forward and aft turnaround areas 33B of the third embodiment, there are provided the turnaround grooves 34B of roughly semicircular contour in cross section, which is somewhat larger in diametral width and in depth than the rolling elements 11B. Besides, the lower component 5B has claws 39B extending sidewise to intrude into the raceway grooves 12B on the guide rail 1B to scoop the rolling elements 11B out of the associated load races 15B. The lengthwise intermediate portions 37B in the conjunctive portions 32B are provided therein with the return grooves 36B that are, as shown in FIG. 29, made in the form of a quarter of a circle in cross section. The hook holes 14B in the end plates 31B are made to have any shape conforming to the corresponding contour of the hooks 44B on the upper component 4B. Between the conjunctive portions 32B of the second component 5B, when viewed in plan as in FIG. 34, there is provided the window 38B surrounded with the sidewise opposite intermediate portions 37B of the conjunctive portions 32B and the lengthwise opposite turnaround areas 33B to allow the lower component 5B to fit over or conform to the bottom surface 50B of the carriage 3B. Moreover, the lower component 5B, when viewed in side elevation as in FIG. 35, is made therein with a concave 22B that extends fore and aft through the forward and aft end plates 31B and between the widthwise opposite turnaround areas 33B in alignment with the concave 27B in the carriage 3B to fit over or conform to the guide rail 1B.

With the linear motion guide unit constructed as stated just earlier, the carriage 3B is provided on widthwise opposite sides thereof with the flanges 10B, which are made by forming the first fore-and-aft recesses 28B and the second fore-and-aft recesses 29B. The carriage 3B with the flanges 10B is made of metals rich in mechanical stiffness while the upper and lower components 4B, 5B are made of resins. With the linear motion guide unit of the third embodiment, after the upper and lower components 4B, 5B have been applied from above and below to the carriage 3B, the conjunctive portions 32B and 42B hold the flanges 10B between them in a geometry not prominent sidewise over the flanges 10B, but flush with the flanges 10B and, therefore, the slider 2B is made ensured in mechanical stiffness in widthwise direction. Besides, all the concaves 27B, 45B and 22B in the carriage 3B, upper component 4B and lower component 5B are kept in alignment with one another to allow the slider 2B to fit over or conform to the guide rail 1B.

The linear motion guide unit constructed as stated earlier makes it easier to shrink the slider 2B as small as allowed. The upper and lower components 4B, 5B, after applied from above and below to the carriage 3B to put the carriage 3B between them, are joined together in a single assembling operation with the help of fit-engagement of the hooks 44B with the hook holes 14B. As there is no need to provide any fastening means such as screws on the carriage 3B, the slider 2B itself may be made ultimately simple in construction as well as finished with high accuracy because of relieved of a likelihood of cumulative error that would be otherwise caused by assembling procedures of three components. Moreover, since the metallic carriage 3B is made responsible for bearing the other parts mounted thereon across the overall breadth thereof, the slider 2B by itself may be ensured in desired mechanical stiffness and, therefore, made miniaturized in size. The slider 2B is allowed to shrink it down to, for example 6.5 mm in length, 4 mm in width and 2.5 mm in height and correspondingly the guide rail 1B is made as tiny as, for example 1 mm in width and 1.4 mm in height. This miniaturization technology as stated earlier makes it possible to shrink the linear motion guide unit down to 2.5 mm in height.

Figure 42:
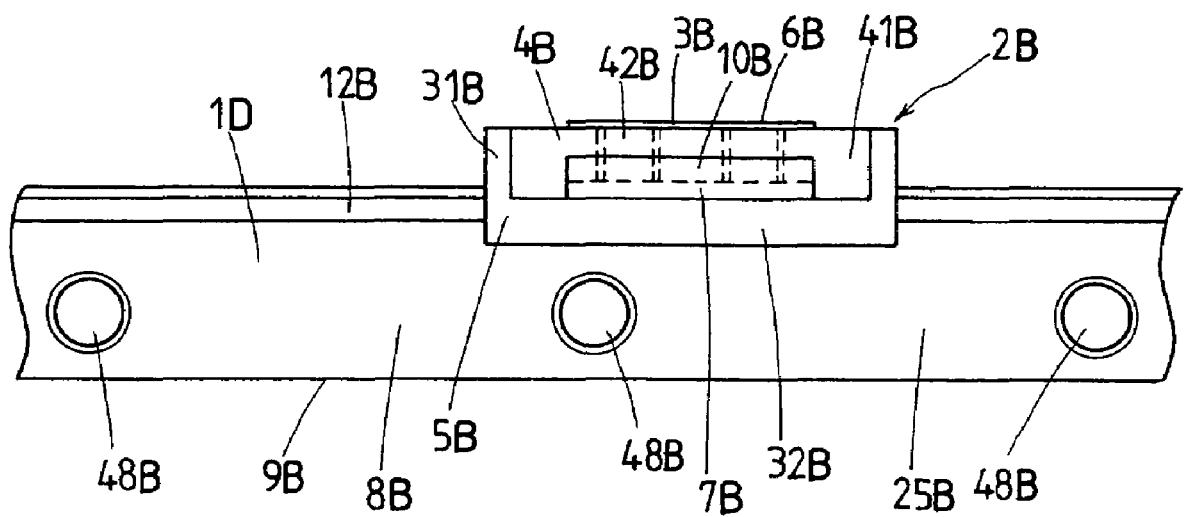
FIG. 42 is a front elevation, partly broken away, showing a fourth embodiment of a linear motion guide unit according to the present invention.

Referring finally to FIG. 42, there is illustrated a fourth version of the linear motion guide unit constructed according to the present invention. A slider 2B in the fourth version is substantially identical with the previously described slider. Thus, the components are given the same reference characters, so that the previous description will be applicable. The guide rail is denoted with a suffix of alphabetic sign "D". The guide rail 1D of the fourth version is made in the form of rectangle in cross section, which is large in height, for example 3.1 mm in height. The guide rail 1D is made in the sides thereof with threaded holes 48D that are disposed lengthwise at selected intervals and used to fasten any other part to the guide rail 1D.

What is claimed is:

1. A linear motion guide unit; comprising a guide rail having a pair of first raceway grooves extending in lengthwise direction of the guide rail, a slider conforming to the guide rail for movement relatively to the guide rail and also having second raceway grooves in opposition to the first raceway grooves, and more than one rolling element allowed to roll through load races defined between the first and second raceway grooves, the slider being made therein with forward and aft turnaround passages and return passages, the forward and aft turnaround passages being each communicated at one end thereof with the associated load race and at the other end thereof with the associated return passage to make a recirculating circuit allowing the rolling elements to circulate through there;

wherein the slider includes a carriage made therein with the second raceway grooves and first return grooves for the return passages, a first member extended across lengthwise opposite ends of the carriage and provided at lengthwise opposite ends thereof with forward and aft turnaround surfaces to form the forward and aft turnaround passages communicated with lengthwise opposite ends of the associated second raceway groove, and a second member having thereon forward and aft turnaround grooves to form the forward and aft turnaround passages in conjunction with the forward and aft turnaround surfaces, and second return grooves to form the return passages in conjunction with the first return grooves; and wherein the first member is applied to any one surface of the carriage while the second member is applied to any other surface of the carriage to put firmly the carriage between the first and second members, and just the first and second members are joined to one another with engaging means.

2. A linear motion guide unit constructed as defined in claim 1 wherein the engaging means is any one selected from fit-engagement made between parts complementary to one another formed on the first and second members, fusion welding applied at least in part to a closely mated area made between the first and second members, adhesive bonding, and mechanical fastening including screws and staples.

3. A linear motion guide unit constructed as defined in claim 2 wherein the fit-engagement is performed between a hole made in any one of the first and second members and a projection raised above the other member to fit into the hole.

4. A linear motion guide unit constructed as defined in claim 3 wherein the projection is made to have a contour in cross section, where a circle in cross section is partially cut away on diametrically opposite secant lines to have diametrically opposite flat surfaces.

5. A linear motion guide unit constructed as defined in claim 1 wherein the first return grooves cut in the carriage are made on inward surfaces of fore-and-aft wings of the carriage, which are spaced away from one another widthwise of the carriage.

6. A linear motion guide unit constructed as defined in claim 1 wherein the guide rail is made up of a pair of lengthwise sides spaced widthwise away from each other and a bottom joined lengthwise thereof together with the sides to form a lengthwise trough of U-shape in transverse section; and wherein the first raceway grooves are cut into inward surfaces of the sides.

7. A linear motion guide unit constructed as defined in claim 1 wherein the carriage is made on the one surface thereof with first recesses that extend fore and aft along widthwise spaced edges of the carriage and on the other surface thereof with a second recess that extends fore and aft between the widthwise spaced wings of the carriage; wherein the first member fits at first lengthwise conjunctive portions thereof into the first recesses while the second member fits at a second lengthwise conjunctive portion thereof into the second recess; and wherein the first return grooves are cut deep into the second recess while the second raceway grooves are cut into outward sides of the carriage.

8. A linear motion guide unit constructed as defined in claim 7 wherein the first member includes first forward and aft end plates conforming in location to the lengthwise opposite ends of the carriage, the first forward and aft end plates having thereon the turnaround surfaces to form the turnaround passages, the first forward and aft end plates being made integral with the first lengthwise conjunctive portions that extend between the first forward and aft end plates to fit into the first recesses on the carriage, and the first forward and aft end plates being further made on their outward end surfaces thereof with any one of the projection and hole complementary to one another to join the first member to the second member.

9. A linear motion guide unit constructed as defined in claim 8 wherein the second member includes second forward and aft end plates and a major portion that is made integral with the second forward and aft end plates to extend between them, the second forward and aft end plates conforming in location to outward end surfaces of the first forward and aft end plates and having any one of the projection and hole in opposition to the complementary part on the first member to join together the first and second member; and wherein the major portion includes forward and aft turnaround areas merging with their associated second forward and aft end plates, and the second lengthwise conjunctive portion that extends between the forward and aft turnaround areas to fit into the second recess on the carriage, the forward and aft turnaround areas conforming in location to the lengthwise opposite ends of the carriage and having the turnaround grooves communicating with their associated load races, and the second lengthwise conjunctive portion being made therein with the second return grooves.

10. A linear motion guide unit constructed as defined in claim 1 wherein the guide rail has the first raceway grooves that extend lengthwise on widthwise opposite sides of the guide rail, and wherein the first member is applied to any one surface of the carriage while the second member is applied to any other surface of the carriage to put firmly the carriage between the first and second members, and the first and second members are joined to one another with mutual fit-engagement.

11. A linear motion guide unit constructed as defined in claim 10 wherein the first return grooves on the carriage are made on widthwise opposite sides of the carriage.

12. A linear motion guide unit constructed as defined in claim 10 wherein the guide rail is made in a form of rectangle in cross section, which is made in the lengthwise sides thereof with threaded holes that are disposed lengthwise at selected intervals and used to fasten any other part to the guide rail.

13. A linear motion guide unit constructed as defined in claim 10 wherein the carriage is made with a fore and aft concave to fit over the guide rail; wherein the carriage is further made on the one surface thereof with first recesses that extend fore and aft along widthwise spaced edges of the carriage to fit first lengthwise conjunctive portions of the first member into the first recesses, and on the other surface thereof with second recesses that extend fore and aft along widthwise spaced edges of the carriage to fit second lengthwise conjunctive portions of the second member into the second recesses; and wherein the return grooves are cut deep into the second recesses while the second raceway grooves are made in inward surfaces surrounding the fore-and-aft concave made in the carriage.

14. A linear motion guide unit constructed as defined in claim 13 wherein the first member includes first forward and aft end plates conforming in location to lengthwise opposite ends of the carriage, the first forward and aft end plates having thereon the turnaround surfaces to form the turnaround passages, the first forward and aft end plates being made integral with the first lengthwise conjunctive portions that extend between the first forward and aft end plates to fit into the first recesses on the carriage, the first forward and aft end plates in combination with the first lengthwise conjunctive portions defining a first window where the one surface of the carriage is allowed to fit into there, and the first forward and aft end plates being further made on their outward end surfaces thereof with any one of the projection and hole complementary to one another to join the first member to the second member.

15. A linear motion guide unit constructed as defined in claim 14 wherein the second member includes second forward and aft end plates and second lengthwise conjunctive portions made integral with the second forward and aft end plates and extended between the first forward and aft end plates to fit into the second recesses on the carriage, the second forward and aft end plates conforming in location to outward end surfaces of the first forward and aft end plates and having any one of the projection and hole in opposition to the complementary part on the first member to join together the first and second member, and the second lengthwise conjunctive portions including forward and aft turnaround areas and lengthwise intermediate portions extending fore and aft between the forward and aft turnaround areas, the forward and aft turnaround areas conforming in location to the lengthwise opposite ends of the carriage and having the turnaround grooves communicating with their associated load races, and the lengthwise intermediate portions being made therein with the second return grooves, and wherein the forward and aft turnaround areas in combination with the lengthwise intermediate portions defines a second window where the other surface of the carriage is allowed to fit into there.

16. A linear motion guide unit constructed as defined in claim 13 wherein the carriage is provided on widthwise opposite sides thereof with flanges, which are made by forming the first fore-and-aft recesses and the second fore-and-aft recesses, and wherein the first member and the second member are applied to the carriage to put the flanges between the first lengthwise conjunctive portions of the first member and the second lengthwise conjunctive portions of the second member in a way the first and second conjunctive portions are not prominent sidewise over the flanges, but flush with the flanges to make sure of mechanical stiffness of the slider in widthwise direction.

* * * * *